US008761154B2

(12) United States Patent
Altberg et al.

(10) Patent No.: US 8,761,154 B2
(45) Date of Patent: Jun. 24, 2014

(54) METHODS AND APPARATUSES TO ACCESS ADVERTISEMENTS THROUGH VOICE OVER INTERNET PROTOCOL (VOIP) APPLICATIONS

(76) Inventors: Ebbe Altberg, Mill Valley, CA (US); Scott Faber, San Francisco, CA (US); Ron Hirson, San Francisco, CA (US); Sean Van der Linden, Berkeley, CA (US)

(*) Notice: Subject to any disclaimer, the term of this patent is extended or adjusted under 35 U.S.C. 154(b) by 1789 days.

(21) Appl. No.: 11/274,453

(22) Filed: Nov. 14, 2005

(65) Prior Publication Data
US 2007/0081662 A1    Apr. 12, 2007

Related U.S. Application Data

(60) Provisional application No. 60/721,793, filed on Sep. 28, 2005.

(51) Int. Cl.
H04L 12/66    (2006.01)
(52) U.S. Cl.
USPC ......................................................... 370/352
(58) Field of Classification Search
USPC .................. 370/352, 401; 455/414.1; 705/14; 379/93.24, 93.01, 352
See application file for complete search history.

(56) References Cited

U.S. PATENT DOCUMENTS

| 4,313,035 | A | 1/1982 | Jordan et al. |
|---|---|---|---|
| 4,577,065 | A | 3/1986 | Frey et al. |
| 4,631,428 | A | 12/1986 | Grimes |
| 4,645,873 | A | 2/1987 | Chomet |
| 4,677,434 | A | 6/1987 | Fascenda |
| 4,723,283 | A | 2/1988 | Nagasawa et al. |
| 4,741,025 | A | 4/1988 | Maruyama et al. |
| 4,751,669 | A | 6/1988 | Sturgis et al. |
| 4,752,675 | A | 6/1988 | Zetmeir |
| 4,788,718 | A | 11/1988 | McNabb et al. |

(Continued)

FOREIGN PATENT DOCUMENTS

| AU | 699785 | 5/1995 |
|---|---|---|
| GB | 2329046 A | 10/1999 |

(Continued)

OTHER PUBLICATIONS

U.S. Appl. No. 09/596,466, filed Jun. 9, 2000, Agdeppa, Hector A.

(Continued)

*Primary Examiner* — Sonia Gay
(74) *Attorney, Agent, or Firm* — Greenberg Traurig LLP

(57) ABSTRACT

Voice over Internet Protocol (VoIP) terminals with integrated user interface for accessing and/or managing advertisements that provide telephonic contact information. In one embodiment, a method includes: receiving a user input in a user interface of a VoIP telephonic apparatus to specify one or more search terms; submitting the one or more search terms from the telephonic apparatus to a server; receiving one or more advertisements containing one or more references to telephonic contact information as a result of a search performed using the one or more search terms; displaying the one or more advertisements in the user interface of the VoIP telephonic apparatus; receiving a user indication in the user interface of the VoIP telephonic apparatus to call an advertiser of the one or more advertisements; and initiating a telephonic call to the advertiser according to the one or more advertisements using the VoIP telephonic apparatus.

20 Claims, 17 Drawing Sheets

(56) References Cited

U.S. PATENT DOCUMENTS

| | | |
|---|---|---|
| 4,796,293 A | 1/1989 | Blinken et al. |
| 4,847,890 A | 7/1989 | Solomon et al. |
| 5,058,152 A | 10/1991 | Solomon et al. |
| 5,099,510 A | 3/1992 | Blinken, Jr. et al. |
| 5,146,491 A | 9/1992 | Silver et al. |
| 5,148,474 A | 9/1992 | Haralambopoulos et al. |
| 5,155,743 A | 10/1992 | Jacobs |
| 5,319,542 A | 6/1994 | King, Jr. et al. |
| 5,325,424 A | 6/1994 | Grube |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,373,549 A | 12/1994 | Bales et al. |
| 5,436,957 A | 7/1995 | McConnell |
| 5,448,625 A | 9/1995 | Lederman |
| 5,453,352 A | 9/1995 | Tachibana |
| 5,483,352 A | 1/1996 | Fukuyama et al. |
| 5,483,588 A | 1/1996 | Eaton et al. |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,539,813 A | 7/1996 | Jonsson |
| 5,544,237 A | 8/1996 | Bales et al. |
| 5,555,298 A | 9/1996 | Jonsson |
| 5,557,677 A | 9/1996 | Prytz |
| 5,559,875 A | 9/1996 | Bieselin et al. |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,608,786 A | 3/1997 | Gordon |
| 5,615,213 A | 3/1997 | Griefer |
| 5,619,555 A | 4/1997 | Fenton et al. |
| 5,619,570 A | 4/1997 | Tsutsui |
| 5,619,725 A | 4/1997 | Gordon |
| 5,619,991 A | 4/1997 | Sloane |
| 5,634,012 A | 5/1997 | Stefik et al. |
| 5,638,432 A | 6/1997 | Wille et al. |
| 5,644,715 A | 7/1997 | Baugher |
| 5,646,984 A | 7/1997 | Oda |
| 5,675,734 A | 10/1997 | Hair |
| 5,689,553 A | 11/1997 | Ahuja et al. |
| 5,694,549 A | 12/1997 | Carlin et al. |
| 5,701,419 A | 12/1997 | McConnell |
| 5,710,887 A | 1/1998 | Chelliah et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,734,961 A | 3/1998 | Castille |
| 5,740,231 A | 4/1998 | Cohn et al. |
| 5,740,549 A | 4/1998 | Reilly et al. |
| 5,745,681 A | 4/1998 | Levine et al. |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Patrecca et al. |
| 5,793,851 A | 8/1998 | Albertson |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,822,411 A | 10/1998 | Swale et al. |
| 5,825,869 A | 10/1998 | Brooks et al. |
| 5,825,876 A | 10/1998 | Peterson, Jr. |
| 5,828,839 A | 10/1998 | Moncreiff |
| 5,832,523 A | 11/1998 | Kanai et al. |
| 5,835,896 A | 11/1998 | Fisher et al. |
| 5,841,763 A | 11/1998 | Leondires et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,907,677 A | 5/1999 | Glenn et al. |
| 5,911,132 A | 6/1999 | Sloane |
| 5,914,951 A | 6/1999 | Bentley et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,946,646 A | 8/1999 | Schena et al. |
| 5,960,070 A | 9/1999 | O'Donovan |
| 5,960,416 A | 9/1999 | Block |
| 5,974,141 A | 10/1999 | Saito |
| 5,974,398 A | 10/1999 | Hanson et al. |
| 5,982,754 A | 11/1999 | Itou et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,999,609 A | 12/1999 | Nishimura |
| 5,999,611 A | 12/1999 | Tatchell et al. |
| 6,006,197 A | 12/1999 | d'Eon et al. |
| 6,011,794 A | 1/2000 | Mordowitz et al. |
| 6,014,644 A | 1/2000 | Erickson |
| 6,026,087 A | 2/2000 | Mirashrafi et al. |
| 6,026,148 A | 2/2000 | Dworkin et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardener et al. |
| 6,130,933 A | 10/2000 | Miloslavsky |
| 6,131,085 A | 10/2000 | Rossides |
| 6,144,670 A | 11/2000 | Sponaugle et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,188,673 B1 | 2/2001 | Bauer et al. |
| 6,188,761 B1 | 2/2001 | Dickerman et al. |
| 6,192,050 B1 | 2/2001 | Stovall |
| 6,199,096 B1 | 3/2001 | Mirashrafi et al. |
| 6,212,192 B1 | 4/2001 | Mirashrafi et al. |
| 6,223,165 B1 | 4/2001 | Lauffer |
| 6,230,287 B1 | 5/2001 | Pinard et al. |
| 6,243,684 B1 | 6/2001 | Stuart et al. |
| 6,259,774 B1 | 7/2001 | Miloslavsky |
| 6,269,336 B1 | 7/2001 | Ladd et al. |
| 6,269,361 B1 | 7/2001 | Davis et al. |
| 6,292,799 B1 | 9/2001 | Peek et al. |
| 6,298,056 B1 | 10/2001 | Pendse |
| 6,301,342 B1 | 10/2001 | Ander et al. |
| 6,301,350 B1 | 10/2001 | Henningson et al. |
| 6,304,637 B1 | 10/2001 | Mirashrafi et al. |

(56) References Cited

U.S. PATENT DOCUMENTS

| | | |
|---|---|---|
| 6,310,941 B1 | 10/2001 | Crutcher et al. |
| 6,314,402 B1 | 11/2001 | Monaco et al. |
| 6,353,663 B1 | 3/2002 | Stevens et al. |
| 6,385,583 B1 | 5/2002 | Ladd et al. |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,430,276 B1 | 8/2002 | Bouvier et al. |
| 6,434,527 B1 | 8/2002 | Horvitz |
| 6,463,136 B1 | 10/2002 | Malik |
| 6,470,079 B1 | 10/2002 | Benson |
| 6,470,317 B1 | 10/2002 | Ladd et al. |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,504,920 B1 | 1/2003 | Okon et al. |
| 6,510,417 B1 | 1/2003 | Woods et al. |
| 6,523,010 B2 | 2/2003 | Lauffer |
| 6,529,878 B2 | 3/2003 | De Rafael et al. |
| 6,535,506 B1 | 3/2003 | Narain et al. |
| 6,539,359 B1 | 3/2003 | Ladd et al. |
| 6,546,372 B2 | 4/2003 | Lauffer |
| 6,549,889 B2 | 4/2003 | Lauffer |
| 6,560,576 B1 | 5/2003 | Cohen et al. |
| 6,606,376 B1 | 8/2003 | Trell |
| 6,625,595 B1 | 9/2003 | Anderson et al. |
| 6,636,590 B1 | 10/2003 | Jacob et al. |
| 6,658,389 B1 | 12/2003 | Alpdemir |
| 6,690,672 B1 | 2/2004 | Klein |
| 6,757,364 B2 | 6/2004 | Newkirk |
| 6,788,769 B1 * | 9/2004 | Waites .................... 379/93.24 |
| 6,836,225 B2 | 12/2004 | Lee et al. |
| 6,865,540 B1 | 3/2005 | Faber et al. |
| 6,882,985 B1 | 4/2005 | Kay et al. |
| 6,968,174 B1 | 11/2005 | Trandal et al. |
| 6,988,126 B2 | 1/2006 | Wilcock et al. |
| 7,027,802 B2 * | 4/2006 | Kim ........................ 455/414.1 |
| 7,103,167 B2 | 9/2006 | Brahm et al. |
| 7,177,415 B1 | 2/2007 | Kim et al. |
| 7,340,048 B2 | 3/2008 | Stern et al. |
| 7,450,566 B2 | 11/2008 | Wong |
| 7,486,781 B2 | 2/2009 | Newman et al. |
| 7,533,144 B2 | 5/2009 | Kassab |
| 7,548,915 B2 | 6/2009 | Ramer et al. |
| 7,734,502 B1 | 6/2010 | Yehoshua et al. |
| 8,027,878 B2 | 9/2011 | Wong et al. |
| 8,095,467 B2 | 1/2012 | Bettinger |
| 2001/0026609 A1 * | 10/2001 | Weinstein et al. ......... 379/93.01 |
| 2001/0032247 A1 | 10/2001 | Kanaya |
| 2001/0036822 A1 | 11/2001 | Mead et al. |
| 2001/0037283 A1 | 11/2001 | Mullaney |
| 2001/0048737 A1 | 12/2001 | Goldberg et al. |
| 2002/0003867 A1 | 1/2002 | Rothschild et al. |
| 2002/0029241 A1 | 3/2002 | Yokono et al. |
| 2002/0038233 A1 | 3/2002 | Shubov et al. |
| 2002/0055350 A1 | 5/2002 | Gupte |
| 2002/0065959 A1 | 5/2002 | Kim et al. |
| 2002/0075844 A1 | 6/2002 | Hagen |
| 2002/0087565 A1 | 7/2002 | Hoekman et al. |
| 2002/0095331 A1 | 7/2002 | Osman et al. |
| 2002/0095367 A1 | 7/2002 | Mizunuma et al. |
| 2002/0107697 A1 | 8/2002 | Jensen |
| 2002/0120554 A1 | 8/2002 | Vega |
| 2002/0124188 A1 | 9/2002 | Sherman et al. |
| 2002/0133446 A1 | 9/2002 | Lee |
| 2002/0133571 A1 | 9/2002 | Jacob et al. |
| 2002/0167919 A1 | 11/2002 | Marples et al. |
| 2002/0173319 A1 | 11/2002 | Fostick |
| 2002/0191762 A1 | 12/2002 | Benson |
| 2002/0193094 A1 | 12/2002 | Lawless et al. |
| 2003/0043981 A1 | 3/2003 | Lurie et al. |
| 2003/0046161 A1 | 3/2003 | Kamanger et al. |
| 2003/0215078 A1 | 11/2003 | Brahm et al. |
| 2003/0220866 A1 | 11/2003 | Pisaris-Henderson |
| 2003/0223565 A1 | 12/2003 | Montemer |
| 2003/0225682 A1 | 12/2003 | Montemer |
| 2004/0006511 A1 | 1/2004 | Montemer |
| 2004/0010518 A1 | 1/2004 | Montemer |
| 2004/0023644 A1 | 2/2004 | Montemer |
| 2004/0096110 A1 | 5/2004 | Yogeshwar et al. |
| 2004/0103024 A1 | 5/2004 | Patel et al. |
| 2004/0162757 A1 | 8/2004 | Pisaris-Henderson |
| 2004/0204997 A1 | 10/2004 | Blaser et al. |
| 2004/0210458 A1 | 10/2004 | Evans et al. |
| 2004/0234043 A1 | 11/2004 | Argo |
| 2004/0234049 A1 | 11/2004 | Melideo |
| 2004/0234064 A1 | 11/2004 | Melideo |
| 2004/0236441 A1 | 11/2004 | Melideo |
| 2004/0243939 A1 | 12/2004 | Perepa et al. |
| 2004/0249951 A1 | 12/2004 | Grabelsky |
| 2004/0254859 A1 | 12/2004 | Aslanian, Jr. |
| 2004/0258048 A1 | 12/2004 | Melideo |
| 2004/0260413 A1 | 12/2004 | Melideo |
| 2005/0010795 A1 | 1/2005 | Tagawa et al. |
| 2005/0018849 A1 | 1/2005 | Rodriguez et al. |
| 2005/0021744 A1 | 1/2005 | Haitsuka et al. |
| 2005/0044238 A1 | 2/2005 | Jacob et al. |
| 2005/0048961 A1 | 3/2005 | Ribaudo et al. |
| 2005/0049971 A1 | 3/2005 | Bettinger |
| 2005/0065811 A1 | 3/2005 | Chu et al. |
| 2005/0080878 A1 | 4/2005 | Cunningham et al. |
| 2005/0165666 A1 * | 7/2005 | Wong et al. ..................... 705/34 |
| 2005/0203799 A1 | 9/2005 | Faber et al. |
| 2005/0207432 A1 | 9/2005 | Velez-Rivera et al. |
| 2005/0209874 A1 | 9/2005 | Rossini |
| 2005/0220289 A1 | 10/2005 | Reding |
| 2005/0245274 A1 | 11/2005 | Oishi et al. |
| 2005/0256766 A1 | 11/2005 | Garcia et al. |
| 2005/0289063 A1 | 12/2005 | Trossen et al. |
| 2006/0004627 A1 * | 1/2006 | Baluja ............................ 705/14 |
| 2006/0004789 A1 | 1/2006 | Lunt et al. |
| 2006/0031516 A1 | 2/2006 | Kumer |
| 2006/0069610 A1 | 3/2006 | Rossini |
| 2006/0074760 A1 | 4/2006 | Helin |
| 2006/0075104 A1 | 4/2006 | Kumer |
| 2006/0078096 A1 | 4/2006 | Poyhonen et al. |
| 2006/0095343 A1 | 5/2006 | Clarke et al. |
| 2006/0159063 A1 * | 7/2006 | Kumar ........................... 370/352 |
| 2006/0165068 A1 | 7/2006 | Dalton et al. |
| 2006/0245576 A1 | 11/2006 | Henry |
| 2007/0005585 A1 | 1/2007 | Feng et al. |
| 2007/0112656 A1 | 5/2007 | Howe et al. |
| 2007/0130338 A1 | 6/2007 | Malik et al. |
| 2007/0160076 A1 | 7/2007 | Faber et al. |
| 2007/0162334 A1 | 7/2007 | Altberg et al. |
| 2007/0165804 A1 | 7/2007 | Altberg et al. |
| 2007/0165841 A1 | 7/2007 | Faber et al. |
| 2007/0177578 A1 | 8/2007 | Anspach et al. |
| 2007/0189520 A1 | 8/2007 | Altberg et al. |
| 2007/0202881 A1 | 8/2007 | Dervan |
| 2007/0206506 A1 | 9/2007 | Purpura |
| 2007/0230374 A1 | 10/2007 | Altberg et al. |
| 2007/0230671 A1 | 10/2007 | Altberg et al. |
| 2007/0230674 A1 | 10/2007 | Altberg et al. |
| 2007/0230679 A1 | 10/2007 | Altberg et al. |
| 2007/0242626 A1 | 10/2007 | Altberg et al. |
| 2008/0005268 A1 | 1/2008 | Chen |
| 2008/0008306 A1 | 1/2008 | Kilger |
| 2008/0071554 A1 | 3/2008 | Miles et al. |
| 2008/0107102 A1 | 5/2008 | Kaufman et al. |
| 2008/0144604 A1 | 6/2008 | Sharma et al. |
| 2009/0037309 A1 | 2/2009 | Altberg et al. |
| 2009/0113312 A1 | 4/2009 | Schoenberg |
| 2009/0138317 A1 | 5/2009 | Schoenberg |

(56) References Cited

U.S. PATENT DOCUMENTS

| | | | |
|---|---|---|---|
| 2009/0161856 A1 | 6/2009 | Lurie | |
| 2009/0323670 A1 | 12/2009 | Altberg et al. | |
| 2010/0191657 A1 | 7/2010 | Melideo | |

FOREIGN PATENT DOCUMENTS

| | | |
|---|---|---|
| JP | 03239040 | 10/1991 |
| JP | 409233441 A | 9/1997 |
| JP | 409319812 A | 12/1997 |
| JP | 2002278858 | 9/2002 |
| JP | 2003337896 | 11/2003 |
| JP | 2004104252 | 4/2004 |
| JP | 2005141583 | 6/2005 |
| KR | 20010086595 | 9/2001 |
| KR | 20030043827 | 6/2003 |
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |
| WO | 9955066 | 10/1999 |
| WO | WO 02/44870 | 6/2002 |
| WO | PCT/US01/51181 | 3/2003 |
| WO | 03102738 | 12/2003 |

OTHER PUBLICATIONS

U.S. Appl. No. 60/198,642, filed Apr. 20, 2000, Rothschild et al.
U.S. Appl. No. 60/471,535, filed May 19, 2003, Melideo.
Abhaya Asthana and Paul Krzyzanowski, "A Small Domain Communications System for Personalized Shopping Assistance," Proceedings of ICPWC'94, Publication No. 0-7803-1996-6/94,IEEE, 1994, pp. 199-203.
Amir Herzberg, et al., "MiniPay: Charging Per Click on the Web," Computer Networks and ISDN Systems 29, (Sep. 1997) vol. 29, pp. 939-951.
Answers.com Web Page (www.answers.com).
"Applying Technology News," Accounting Technology, p. 14 (Feb./Mar. 1997).
Aspect Telecomm: Aspect Integrates the Web into the Call Center, M2 Presswire, Aug. 1996.
Barbara Jarvie, "Company Devoted to Hot-Line Support", Computer Reseller News, Oct. 21, 1991, p. 48.
Big Green Blog: Jan. 2005 Archives, Feb. 21, 2006.
Caring for Customers: Real-Time text chat and telephony provide personalized customer support and turn queries into sales leads, Internet World Media, Sep. 1999.
Chris Ott, "Making Good on the Information Economy". Denver Business Journal, Dec. 17, 1999, p. 27.
Christina Wood, "Hidden Cost of Tech Support", PC World, May 1995, pp. 143-152 & p. 156.
Collett, Stacey & Julie King, "Why Online Browsers Don't Become Buyers," Computerworld, vol. 33, No. 48, p. 14 (Nov. 1999).
"Connecting to On-Line Car Shoppers: Auto Sellers Use Netcall Internet Call-Button Technology to Turn Clicks into Interactive Sales", Business Wire, p. 4089., Jul. 1999.
Cynthia Hodgson, "Online Expert Databases & Services", Econtent, Dec. 1999, p. 48-53.
Davey, Tom, "Wheeling and Dealing Online", PC Week, vol. 13, No. 45, pp. 1, 129., Nov. 1996.
E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.
Edith Herman, "US Courts to Launch First Federal 900 Service," Federal Computer Week, Sep. 28, 1992, p. 8.
Ellen Greenbalt, "Have you ever wondered . . . ", Datamation, Oct. 1997, p. 12.
Exp.com Web Site at www.exp.com/.
"Expertcity.com Launches Premier Online Marketplace for Expert Services," PR Newswire (Aug. 1999).

For Telesphere's Clients, Dial '1-900-TUF Luck', Business Week, Sep. 9, 1991, 88.
Franco Mercalli, et al., "TheESSAI Teleshopping System: An Example of Broadband Multimedia Application," Publication No. 0-7803-1820-X/94, IEEE, pp. 572-576 (1994).
Gregory Dalton, "Rent-An-Expert on the Web," Information Week p. 75 (Sep. 6, 1999).
Healey, Jon, "From A to Z, You Can Sell Advice Online." Retrieved from http://www.mercurycenter.com on Oct. 24, 2000, published on Nov. 7, 1999.
Infomarkets.com Web Site (www.infomarkets.com).
Information about Expertcity.com retrieved from the Internet [http://www.expertcity.com] on Nov. 6, 2000.
Information about Expertcity.com retrieved from the Internet [URL:http://www.expertcity.com] on Apr. 9, 2000.
Information, Bid and Asked, Forbes, Aug. 20, 1990, 92.
Ingenio Press Archives for 2004, www.ingenio.com, Feb. 21, 2006.
Intellect Exchange Web Site (www.intellectexchange.com).
"Introducing 1-800-FREE411: First Nationwide Free Telephone Directory Assistance Service" Jingle Networks, Inc., Huntington Beach, Calif., Sep. 20, 2005.
ISDN Tutorial: Definitions, http://www.ralphb.net/ISDN/defs.html (Apr. 21, 2000).
ISDN Tutorial:Interfaces, http://www.ralphb.net/ISDN/ifaces.html, printed on Apr. 21, 2000.
J. Sairamesh, et al., "NetBazaar: Networked Electronic Markets for Trading Computation and Information Services", Research and Advanced Technology for Digital Libraries, Second European Conference, ECDL 1998, pp. 839-856 (Sep. 21-23, 1998).
J.W.R. Griffiths, et al., "Multimedia Communication in a Medical Environment", IEEE 1991 Singapore I.C. on Networks, p. 166 (8 pgs.).
"Jambo Launches to Connect People and businesses From the Internet to the Phone", Agoura Hills, Calif. May 3, 2005.
"Jambo Names Netzero Co-founder Stacy Haitsuka to New Post of Chief Information Officer", Agoura Hills, Calif., Jul. 5, 2005.
"Jambo Receives $5 Million in Financiing from Kline Hawkes & Co., Westlake Venture Partners, Others", Agoura Hills, Calif., Oct. 17, 2005.
Jeff Pelline, "Net Firm to Connect Users by Phone," CNET News.com [retrieved from http://new.cnet.com] (Oct. 24, 2001) published Nov. 8, 1999.
Joann M. Wasik, "Information for Sale: Commercial Digital Reference and AskA Service", Virtual Reference Desk, Sep. 20, 1999, at www. vrd.org/AskA/commAskA.html.
John Robinson, "Attachmate Ready to Answer Net Questions", Network World, Apr. 8, 1996, p. 37.
Joseph Menn, "An Expert? There's Now a Home for You on the Internet", Los Angeles Times (retrieved from http://denverpost.com on Oct. 24, 2001).
Keen.com, Inc. v. InfoRocket.com, Inc., Complaint for Patent Infringement, Trade Dress Infringement and Unfair Competition; Demand for Jury Trial filed Aug. 31, 2001, pp. 1-8 plus 17 pgs. of attachments.
Keen.com, Inc. v. InfoRocket.com, Inc., Preliminary Injunction Hearing, pp. 286-289 (Jan. 8, 2002).
Keen.com Feb. 4, 2006.
Keen.com Plans Web Service Allowing Customers to Hold Private Phone Chats, Don Clark, Wall Street Journal, Nov. 8, 1999.
Keen.com raises $60 Million from Prestigious . . . , Business Wire, Jan. 11, 2000.
"Keen.com™ Launches First Live Answer Community™, Connects People with Information to Share Over Their. Standard Telephone", Press Release [retrieved from http://keen.com] (Oct. 24, 2000), published Nov. 8, 1999.
Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.
L. F. Ludwig and D. F. Dunn, "Laboratory for Emulation and Study of Integrated and Coordinated Media Communication," Conference on Office Communication Systems, Mar. 23-25, 1988, Sponsored by ACM SIGOIS and IEEECS TC-OA in cooperation with IFIP W.G. 8.4, pp. 283-291.

(56) References Cited

OTHER PUBLICATIONS

Linda Littleton, "Meet the Shadowy Future," Proceedings of ACM SIGUCCS User Services Conference XXII Ypsilanti, Michigan Oct. 16-19, 1994, pp. 205-210.
"Lucent Technology and Netscape Team to Deliver Lucent Ecommerce Solutions," Business Wire, Sep. 1998.
Masahiko Hase, Shuji Kawakubo and Mineo Shoman, "Advanced Videophone System Using Synchronized Video Filing Equipment," NTT Review, vol. 3, No. 4 Jul. 1991, pp. 29-36.
Michael Kanellos, "Do You Want to Know the Meaning of Life?", Computer Reseller News, Mar. 3, 1997, pp. 72-74.
Michael Rogers et al, "Experts Abound at New Web Sites", Library Journal, Mar. 1, 2000, pp. 22-24.
"Netcall Internet Call Buttons Enhance E-Commerce Customer Service and Sales", PR Newswire, p. 7431., Aug. 1999.
PCT Search Report for PCT Application No. PCT/US01/48284, filed Oct. 30, 2001 (corresponding to U.S. Appl. No. 09/702,217) mailed May 13, 2002 (7 pgs.).
Qcircuit Web Site (www.qcircuit.com).
Richard A Kuehn, "The Voice of Technology," Credit World, pp. 20-23 (Jul. 1994).
Sell and buy advice online, The Ottawa Citizen, Nov. 29, 1999.
"Surfbrains.com: Brains online save time & money", M2 Presswire, Jul. 11, 2000.
Tehrani, Rich, "e-Rip Van Winkle and the 60 Second Nap," Call Center Solution, vol. 18, No. 2, pp. 16(3)., Aug. 1999.
Telecommunications Buyers Guide and Directory, Editor & Publisher, pp. 29TC-38TC, Feb. 1994.
The Web Site at www.experts-exchange.com/.
The web-site at www.allexperts.com.
"TriNet's, Help Me, I'm Stuck, Internet Voice Button Services Pushes Web Pages to Online Users." Business Wire, Mar. 1998.
"USA Global Link Brings Interactively to Internet Shopping," Business Wire, Oct. 1998.
"UpSnap Selects LookSmart to Sell Premium Listings on FREE 411 Service for Text-Enabled Cell Phones", Nov. 4, 2004.
"Walker Digital Issued Landmark U.S. Patent No. 5,862,223 for Global Internet Marketplace for Experts", Business Wire, Jan. 26, 1999.
Welcome to the Electronic Emissary Project's WebCenter at www.tapr.org/emmisary/.
"Welcome to Jambo—the leader in Pay-per-Call Solutions" (search results) Oct. 17, 2005.
When Business Plan and Real World Clash, Wall Street Journal, Jun. 9, 1999, B1.
William H. Chimiak, et al, "Multimedia Collaborative Remote Consultation Tools Via Gigabit WAN in Teleradiology", IEEE 1994, Phoenix, p. 417 (7 pgs.).
PCT Written Opinion of The International Searching Authority for PCT/US2006/037712.
PCT International Search Report for PCT/US2006/037712.
eStara, Inc., "Pay Per Call is Not a Peer-to-Peer Application", http://www.estara.com/aboutus/news/ebay/php, Sep. 13, 2005.
Jyve Corporation, "Jyve Solutions :: Skype Card", http://plugin.jyve.com/skypecard/, available as early as Sep. 26, 2005.
Jyve Corporation, "Skype Card—jyvetest1", http://skypecard.jyve.com/jyvetest1.htm, available as early as Sep. 26, 2005.
Jyve Corporation, "Skype Portal—Jyve", http://www.jyve.com/, available as early as Sep. 26, 2005.
Skype, Inc., "eBay to Acquire Skype", http://www.skype.com/company/news/2005/skype_ebay.html, Sep. 12, 2005.
Parker, Pamela, "EBay Jumps on Pay-Per-Call Bandwagon with Skype Buy", http://www.clickz.com/news/print.php/3548041, Sep. 12, 2005.
eBay, Inc., "Ebay PayPal Skype Acquisition of Skype", presentation, www.emory.edu/BUSINESS/readings/voip/eBay-Skype.pdf available as early as Sep. 12, 2005.
USPTO Transaction History of U.S. Appl. No. 11/696,153, filed Apr. 3, 2007, entitled "Systems and Methods and Facilitate Transition from Communications to Commerce."
USPTO Transaction History of U.S. Appl. No. 11/752,267, filed May 22, 2007, entitled "Methods and Apparatuses to Connect People for Real Time Communications via Voice Over Internet Protocol (VoIP)."
USPTO Transaction History of U.S. Appl. No. 11/761,800, filed Jun. 12, 2007, entitled "Methods and Apparatuses to Track Information Using Call Signaling Messages."
USPTO Transaction History of U.S. Appl. No. 11/761,932, filed Jun. 12, 2007, entitled "Methods and Apparatuses to Track Information via Passing Information During Telephonic Call Process."
USPTO Transaction History of U.S. Appl. No. 11/761,987, filed Jun. 12, 2007, entitled "Methods and Apparatuses to Track Information via Telephonic Apparatuses."
USPTO Transaction History of U.S. Appl. No. 12/128,449, filed May 28, 2008, entitled "Systems and Methods to Convert a Real Time Communication Connection."
ISA/US, International Search Report for International Application No. PCT/US05/12061, 3 pages, Nov. 17, 2006.
International Application No. PCT/US2008/053306, Written Opinion and International Search Report, Jun. 26, 2008.
International Application No. PCT/US2008/059687, Written Opinion and International Search Report, Aug. 25, 2008.
Sterling, Greg, "Ingenio's Ether—Pay Per Professional Advice," Search Engine Journal, Mar. 3, 2006.
CCBN, Inc. "Full Year 2003 and Q4 Ebookers PLC Earnings Conference Call—Part 2," Fair Disclosure Wire, Mar. 22, 2004.
International Application No. PCT/US07/08968, Written Opinion and International Search Report, Nov. 15, 2007.
International Application No. PCT/US07/82445, Written Opinion and International Search Report, May 23, 2008.

* cited by examiner 181   180

My Advertisement Info

| Personal Info | My Advertisement Info | My Advisor Info |

Ad Location Info

Ad Business Name: Mortgage Loans In Texas    City*: Dallas
☐ Use my Account Info for this ad   State/Province*: TX
Address*: 17300 N. Dallas Parkway #1025   Zip/Postal Code*: 75248
Address2:    Phone*: (214) 651-7789
Country/Region*: United States   Fax:

195

Ad Description

For your ad, please write two lines that describe your business or service. Sorry no website addresses (URLs) or phone numbers unless they are your actual business name.

Description Line 1*: Refinance and save even with damaged credit!   (40 characters)
Description Line 2: Get Cash For Any Reason! Call For Fast Quotes   (40 characters)

189

Choose Service Area, Categories and Price Per Call

187 — Service Area: Dallas, TX    Select Service Area
185 — Categories: Mortgage Banks, Mortgage Brokers    Select Categories
      Price Per Call: $3.00   ($2.00 minimum)    View Competitor Bids 183 Ad Details

☐ Include Logo (optional)
193
☐ Include Hours of Operation (optional)

☑ Include Payment Options (optional)
   ☑ Cash   ☐ Mastercard   ☐ Discover
191
   ☑ Visa   ☐ American Express   ☐ Debit/ATM ☐ Include Coupon (optional)

Ad Details (optional) [            ]

[ Update ]   [ Cancel ]

FIG. 5

| Start Date | 20040501 | | End Date (Inclusive): | 20040601 | | | | | |
|---|---|---|---|---|---|---|---|---|---|
| Call Result | (All) | | Enter Top Level Category | (All) | | | | | |

Category Summary for All Categories
Date Range: 05/01/2004 thru 06/01/2004. Call Result: All Calls. Region: Pacific Northwest

| Category | Advertisers | Calls | Minutes | Callers | Avg Duration | Adv Rec Call | Pct Rec Call | Calls/Adv | Mins/Adv | Callers/Adv | Avg Price/Call | Total Revenue |
|---|---|---|---|---|---|---|---|---|---|---|---|---|
| (All) Auto Dealers | 241 | 362 | 840 | 310 | 1 | 211 | 68% | 2 | 3 | 1 | $6.88 | $2,490.56 |
| (All) Dentists | 195 | 299 | 1,254 | 284 | 3 | 172 | 78% | 2 | 6 | 1 | $4.22 | $1,261.78 |
| (All) Restaurants | 312 | 284 | 663 | 254 | 2 | 275 | 74% | 1 | 2 | 1 | $3.08 | $874.72 |
| Air Conditioning | 188 | 155 | 883 | 135 | 4 | 165 | 68% | 1 | 5 | 1 | $5.22 | $809.10 |
| Architects | 288 | 384 | 842 | 328 | 1 | 253 | 88% | 1 | 3 | 1 | $1.44 | $552.98 |
| Bankruptcy Law | 190 | 280 | 1,248 | 284 | 3 | 167 | 78% | 1 | 7 | 1 | $3.23 | $904.40 |
| Banks | 312 | 277 | 687 | 254 | 2 | 275 | 74% | 1 | 2 | 1 | $6.88 | $1,905.76 |
| Caterers | 192 | 138 | 848 | 143 | 4 | 169 | 68% | 1 | 4 | 1 | $4.22 | $592.36 |
| Cellular Phone Service | 243 | 387 | 837 | 284 | 1 | 214 | 88% | 2 | 3 | 1 | $3.52 | $1,362.24 |
| Chiropractors | 193 | 289 | 543 | 254 | 3 | 170 | 78% | 1 | 3 | 1 | $5.22 | $1,508.58 |
| Collectibles | 308 | 265 | 784 | 135 | 2 | 271 | 74% | 1 | 3 | 0 | $1.44 | $381.60 |
| Copying Services | 188 | 165 | 893 | 328 | 4 | 165 | 68% | 1 | 5 | 2 | $3.23 | $532.95 |
| Data Processing | 254 | 280 | 387 | 284 | 1 | 224 | 88% | 1 | 2 | 1 | $6.88 | $1,926.40 |
| Diamonds | 180 | 277 | 235 | 254 | 3 | 158 | 78% | 2 | 1 | 1 | $4.22 | $1,168.94 |
| Disc Jockeys (DJs) | 316 | 138 | 848 | 143 | 2 | 278 | 74% | 0 | 3 | 0 | $3.08 | $425.04 |
| Divorce Support Groups | 184 | 387 | 837 | 284 | 4 | 162 | 68% | 2 | 5 | 2 | $2.21 | $855.27 |
| Electrolysis Services | 258 | 289 | 543 | 254 | 1 | 227 | 88% | 1 | 2 | 1 | $4.11 | $1,187.79 |
| Electronics Repair | 174 | 265 | 784 | 135 | 3 | 153 | 78% | 2 | 5 | 1 | $3.23 | $855.95 |
| Entertainers | 349 | 165 | 893 | 328 | 2 | 307 | 74% | 0 | 3 | 1 | $3.08 | $598.20 |
| Exercise Programs | 265 | 277 | 387 | 284 | 1 | 233 | 88% | 1 | 1 | 1 | $5.22 | $1,445.94 |
| Family Law | 180 | 138 | 235 | 254 | 3 | 158 | 78% | 1 | 1 | 1 | $1.44 | $198.72 |
| Flooring | 344 | 387 | 849 | 143 | 2 | 303 | 74% | 1 | 2 | 0 | $3.23 | $1,250.01 |
| Florists | 189 | 289 | 758 | 143 | 4 | 166 | 68% | 2 | 4 | 1 | $4.58 | $1,323.62 |
| Totals | 5,543 | 6,177 | 17,078 | 5,499 | 51 | 4,877 | 77% | 27 | 75 | 24 | 89.86 | $24,312.89 |

FIG. 11

METHODS AND APPARATUSES TO ACCESS ADVERTISEMENTS THROUGH VOICE OVER INTERNET PROTOCOL (VOIP) APPLICATIONS

The present application claims the priority of Provisional U.S. Patent Application Ser. No. 60/721,793 filed Sep. 28, 2005, entitled "Methods and Apparatuses to Provide Advertisement Information and Communication Links Using Voice Over Internet Protocol (VoIP) Applications", which is hereby incorporated herein by reference.

TECHNOLOGY FIELD

At least some embodiments of the present invention relate to user interface techniques in telephonic apparatuses, such as terminals of Voice Over Internet Protocol (VOIP) applications.

BACKGROUND

Traditional land-line based telephone systems connect one telephone set to another through one or more switching centers, operated by one or more telephone companies, over a land-line based telephone network. Traditionally, a telephone connection is based on a circuit switched network. To make a telephone connection, a dedicated circuit or channel is set up for the call between two telephone sets to allow the signal transmission on the dedicated channel during the phone call.

Advanced telephone systems may also use a packet switched network for a telephone connection. A packet switched network is typical in a computer data environment, in which data packets are individually routed over data links that might be shared by many other data communication devices.

Recent developments in the field of Voice over IP (VOIP) allow the delivery of voice information using the Internet Protocol, in which voice information is packaged in a digital form in discrete packets rather than in the traditional circuit-committed protocols of the public switched telephone network (PSTN).

Voice over Internet Protocol (VOIP) based telephone calls can be transmitted through a broadband Internet connection instead of a regular (or analog) phone line. Some VoIP services only allow a user to call other people using the same service, but others may allow a user to call anyone who has a telephone number, such as local, long distance, mobile, and international numbers. Typically, a VoIP telephone call is made on a terminal connected to a data communication network, such as a computer that runs a VoIP application on a network connection (e.g., DSL or local area network), a stand alone VoIP phone connected to a communication network, or a traditional phone with an adaptor connected to a network connection.

In a typical VoIP communication, an Analog to Digital Converter (ADC) converts analog voice signal to digital data, which is sent through a data transmission network in data packets in a compressed format using Internet Protocol. At the receiving side, the received data packets are disassembled for the extraction of the digital data. A digital to analog converter (DAC) then converts the digital data back to analog voice signal.

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

BRIEF DESCRIPTION OF THE DRAWINGS

The present invention is illustrated by way of example and not limitation in the figures of the accompanying drawings in which like references indicate similar elements.

FIG. 5 illustrates a user interface to manage an advertisement according to one embodiment of the present invention.

FIGS. 10-11 illustrate screen images of a VoIP application for managing advertisements according to embodiments of the present invention.

SUMMARY

Voice over Internet Protocol (VoIP) terminals with integrated user interface for accessing and/or managing advertisements that provide telephonic contact information are described herein. In one embodiment, a method includes: receiving a user input in a user interface of a VoIP telephonic apparatus to specify one or more search terms; submitting the one or more search terms from the telephonic apparatus to a server; receiving one or more advertisements containing one or more references to telephonic contact information as a result of a search performed using the one or more search terms; displaying the one or more advertisements in the user interface of the VoIP telephonic apparatus; receiving a user indication in the user interface of the VoIP telephonic apparatus to call an advertiser of the one or more advertisements; and initiating a telephonic call to the advertiser according to the one or more advertisements using the VoIP telephonic apparatus.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description. References to one or an embodiment in the present disclosure can be, but not necessarily are, references to the same embodiment; and, such references mean at least one.

At least one embodiment of the present invention seeks to integrate the user interface for accessing and/or managing advertisements that provide telephonic contact information into Voice over Internet Protocol (VoIP) terminals.

In the present application, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may-accept user input through voice recognition or through keypad input generated Dual Tone Multi-Frequency (DTMF) signals), or others.

In one embodiment of the present invention, a VoIP terminal includes a user interface from which a user can make telephonic connections via Voice over Internet Protocol (VoIP). In one embodiment, the user interface includes a graphical user interface.

Figure 1:
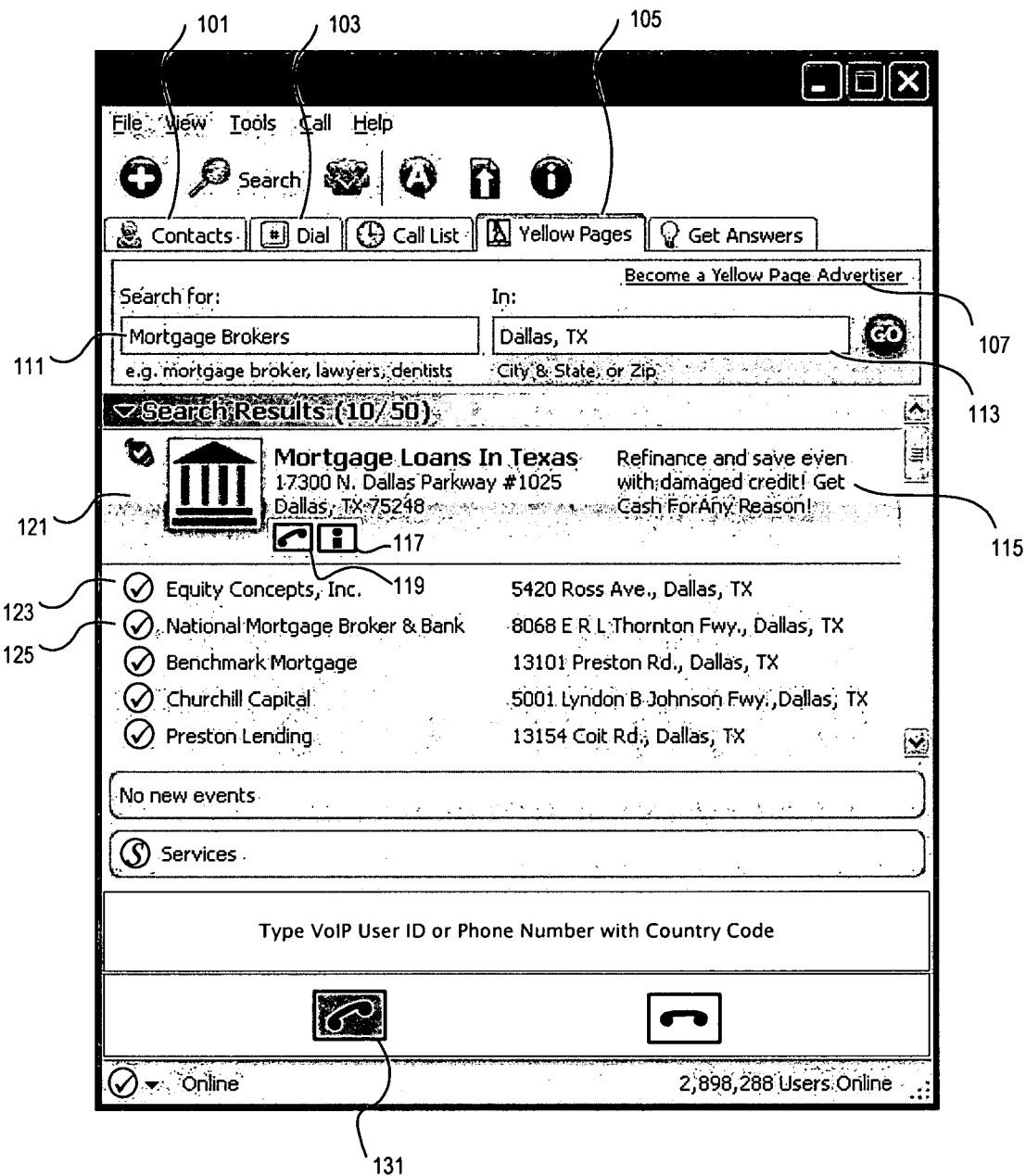
FIGS. 1-3 illustrate screen images of a VoIP application for accessing an advertiser according to embodiments of the present invention.
Figure 2:
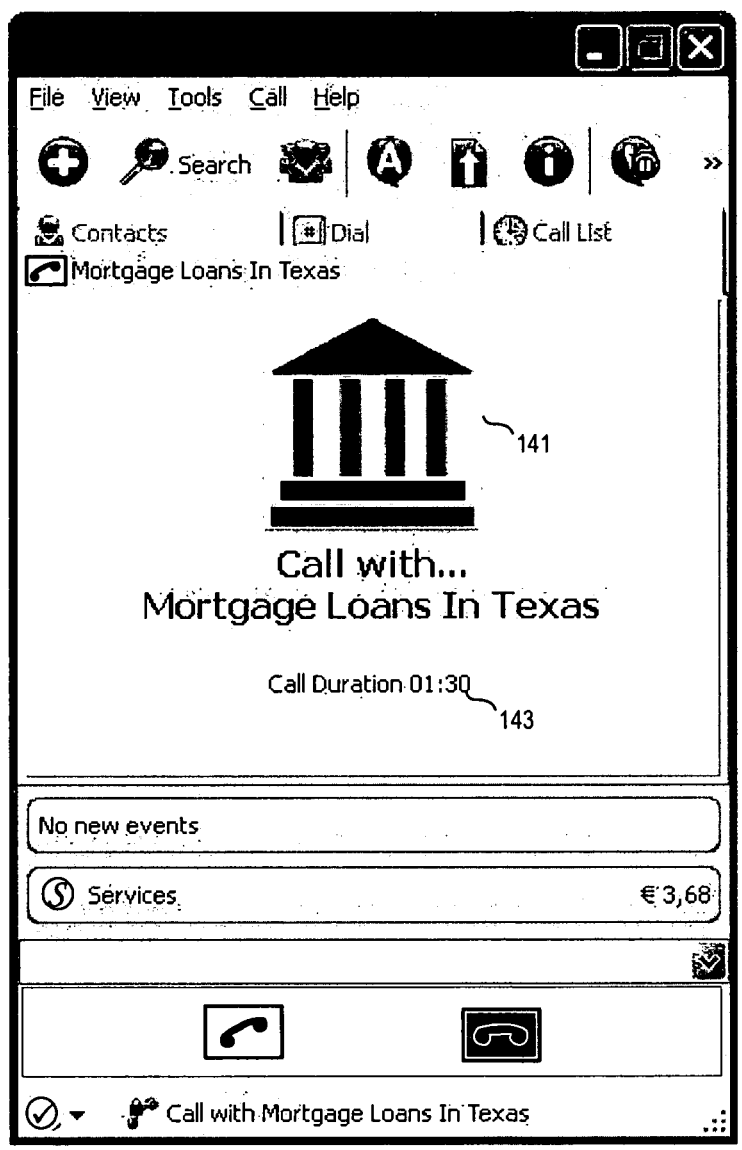
Figure 3:
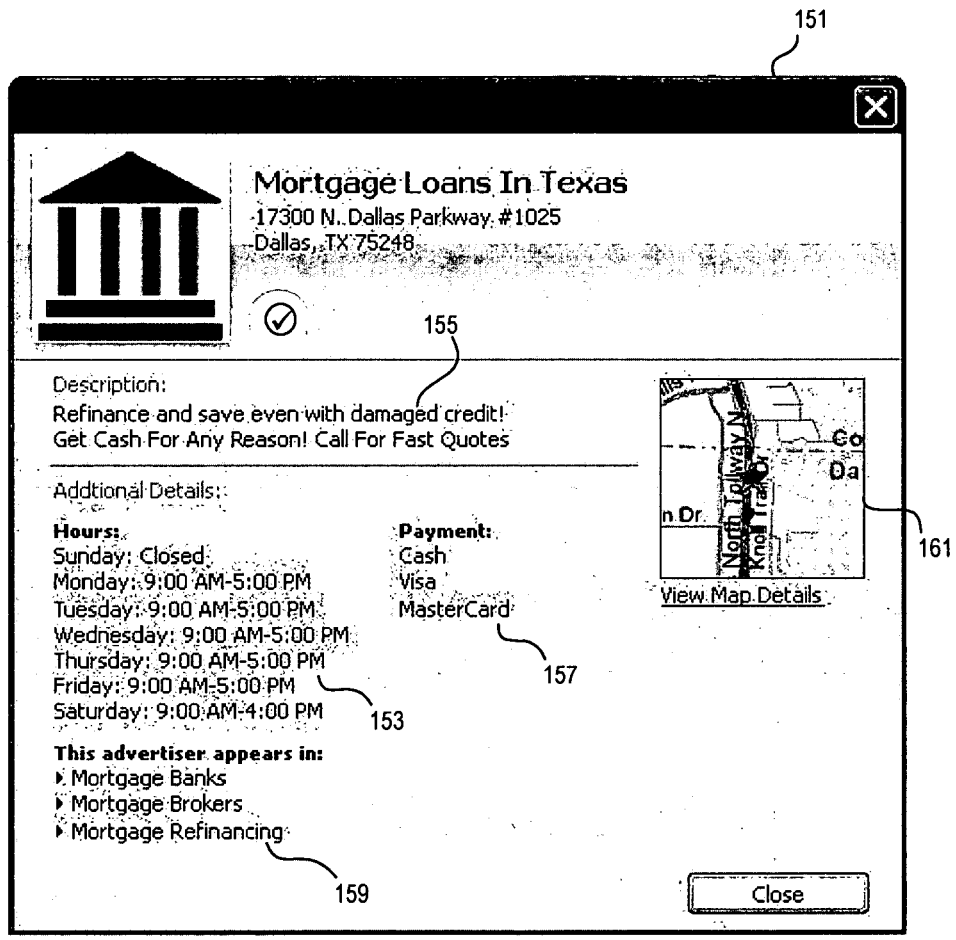

FIGS. 1-3 illustrate screen images of a VoIP application for accessing an advertiser according to embodiments of the present invention.

For example, a user may select a "Contacts" tab (101) to display contact information maintained for the user of the VoIP terminal. A contact information entry can include a phone number or a user ID for the VoIP application. Using the VoIP application on the computing/communication device (e.g., a personal computer, a palm top computer, a notebook computer, a personal digital assistant (PDA), or a special purpose device, such as a VoIP compatible phone, etc.), the user can make a telephonic connection to a remote user. The remote user may use a landline phone, a mobile phone, or a VoIP application (e.g., a personal computer, a palm top computer, a notebook computer, a personal digital assistant (PDA), or a special purpose device)

The user may select a "Dial" tab (103) to directly enter the information (e.g., the ID of the remote user for the VoIP application, or the phone number of the remote user) for "dialing" the VoIP call.

In one embodiment of the present invention, the graphical user interface further includes a tab to perform a search, such as in a "Yellow Pages" tab (105) illustrated in the example screen image of FIG. 1. In the example image, the user can input key words (e.g., "Mortgage brokers") in the entry box (111) under the label "search for" to perform a search for a specific category. In the entry box (113) under the label "In:", the user can input the information about the specific geographic area (e.g., "Dallas, Tex."). For example, a keyword to category algorithm queried with service area returns relevant advertisers, such as "Mortgage Loans in Texas" (121), "Equity Concepts, Inc." (123), "National Mortgage Broker & Bank" (125), etc.

In one embodiment, the advertisers are served based on the amount of bids the advertisers placed on the "Yellow Page Advertisements". For example, the highest bidders matching the search criteria are displayed above and/or before other bidders matching the search criteria are displayed.

When an advertisement entry (e.g., "Mortgage Loans in Texas") (121) is selected, the entry is expanded to reveal more advertisement message for the advertiser (e.g., "Refinance and save even with damaged credit! Get Cash For Any Reason!" (115)). In one embodiment, the expanded entry includes a phone icon (119) which can be selected to initiate a VoIP telephonic connection with the advertiser using the VoIP application. The user may also use the main phone icon (131) to initiate the call to the phone number associated with the selected, expanded entry. The VoIP telephonic connection may be made to a regular landline phone, or a mobile phone, or VoIP terminal. For example, the VoIP telephonic connection may be made through a VoIP application to a phone over a landline, over a cellular communication line to a cellular phone, or over a data communication link (e.g., Internet) to another VoIP application.

In one embodiment, during the phone call the VoIP application displays the call duration (143) and other information about the advertiser, such as the logo (141) of the advertiser, the pricing information of the advertiser, etc., as illustrated in the screen image of FIG. 2. In one embodiment, the advertiser charges the user of the VoIP application with a per minute price, which is displayed during the phone call. Alternatively, the advertiser pays the operator of the VoIP application and/or the advertisement provider (distributor) based on a pay per call price bid; and the pay per call price bid is displayed. In one embodiment, the user interface displays the balance of an account which can be used to pay for the charges related to the call.

In one embodiment, the consumer calls the advertiser using the VoIP application. The phone call is connected to a phone connection server (e.g., of an advertisement provider, which may be the same as, or different from, the service provider of the VoIP application). The phone connection server further connects the phone call to the advertiser. In one embodiment, a separate phone call is placed to the advertiser; and the phone call from the consumer is connected with the phone call with the advertiser.

In one embodiment, the consumer's request to call the advertiser is transmitted to a phone connection server, which makes separate calls to the consumer and the advertiser and joins the separate calls to connect the consumer and the advertiser.

In one embodiment, the VoIP application system determines the communication parameters for the devices of the caller and the callee. Using the communication parameters, the VoIP application on the caller's device and the VoIP application on the callee's device can directly make a communication connection for the VoIP call. In one embodiment, at least one of the VoIP applications is programmed to report the duration of the call to a server which records the call duration. In one embodiment, the online presence information/availability status of the VoIP applications on the network is relayed on a distributed, decentralized network to avoid the use of a central server. Alternatively, a centralized server may be used to facilitate the connections.

In one embodiment, the phone connection server prevents the consumer and the advertiser from gaining information about the other party from the phone connection. The advertiser is not provided with the telephonic information about the consumer (e.g., the VoIP user ID of the consumer, a phone number of the consumer) in making the phone connection; and the consumer is not provided with the telephonic information about the advertiser (e.g., the VoIP user ID of the advertiser, a phone number of the advertiser). Thus, anonymity of the call is maintained (if the advertiser and the consumer do not reveal their telephonic information during the conversation).

In one embodiment, the advertisement provider/distributor charges the advertiser based on the advertiser's current bid for the phone lead in the category and service area that matches the search submitted by the user of the VoIP application. A caller algorithm of the advertisement provider prevents multiple charges. For example, if calls to the advertisement provider from the user of the VoIP application is within a certain time window, such as an hour, a day or a week, these calls may be considered as providing the same phone lead to the advertiser; and the advertiser is charged for only one phone lead.

In one embodiment, a fraud detection system is deployed for the advertisement provider to detect the abuse of the system. For example, the system may detect and stop the use of pay per call advertisement bids as a way to obtain long distance phone calls to a landline phone or a mobile phone.

In one embodiment, the telephonic information about the advertiser is provided to the VoIP application indirectly. For example, instead of providing the regular business phone numbers of the advertiser (e.g., for landline phones or mobile phones), the advertisement provider embeds in the advertisement a phone number, or a reference to the phone number (e.g., a user ID of the VoIP application system) that can be used to reach the phone connection center of the advertisement provider. When the telephonic connection to the advertiser is initiated by the user of the VoIP application, the VoIP application connects to the call connection server, which looks up the contact information of the advertiser and further connects the call to the advertiser. In one example, the call connection server may obtain the phone number of a landline phone or a mobile phone, make a call to the phone number of the advertiser (e.g., partially through a VoIP connection, or through a traditional telephonic connection), and join the call to the advertiser and the call from the user to make the connection. In another example, the call connection server may obtain a VoIP user ID of the advertiser, make a VoIP connection to the advertiser, and join the VoIP connections to connect the advertiser and the user.

In one embodiment, the advertisement provider assigns different phone numbers, or VoIP user IDs, to different advertisements and/or different advertisers for the connection center so that the connection center can look up the telephonic contact information for the corresponding advertisements and/or advertisers. The differences in the phone numbers for different advertisements and/or different advertisers may be in the main phone number (dialed before a connection to the connection center is made), or in the extension of the phone number (dialed after a connection to the connection center is made).

In one embodiment, the connection server of the advertisement provider is integrated with the server of VoIP application. The advertisement contains an ID similar to, or corresponding to, a VoIP user ID. When the server of the VoIP application receives the ID of the advertisement in response to the user's request to telephonically connect to the advertiser (e.g., when a button or a link is selected by the user, the request for a connection is generated; and the ID of the advertisement embedded in the advertisement is automatically transmitted to the server by the VoIP application), the server of the VoIP application looks up the contact information (e.g., the phone number, or the VoIP user ID of the advertiser, etc.) from the advertisement database to connect the phone call to the advertiser in a way similar to that the connection center connects the caller and the advertiser.

In one embodiment, when the user inputs a request to initiate the phone call, the VoIP user ID of the user (or the equivalent information for making a VoIP connection to the user) is transmitted to the connection center together with a reference to the advertiser and/or the advertisement. The connection center then starts the VoIP connection to the VoIP application of the user and a separate connection to the advertiser. The connections are joined to connect the user and the advertiser. The separate connection to the advertiser may be via VoIP, or via regular circuit switched call, or via VoIP for part of the transmission path and via a circuit switched network for the remaining part of the transmission path.

In one embodiment, the expanded entry further includes an information icon (e.g., 117 in FIG. 1), which can be selected to provide a profile page about the advertiser, as illustrated in the example screen image (151) shown in FIG. 3. For example, the profile page may include the business hours (153) of the advertiser, a description (155) of the advertiser, payment methods (157) accepted by the advertiser for purchasing products/services, categories (159) under which the advertiser is listed, a map (161) showing the location near the advertiser, and/or a link to view map details about the location near the advertiser, etc.

Figure 4:
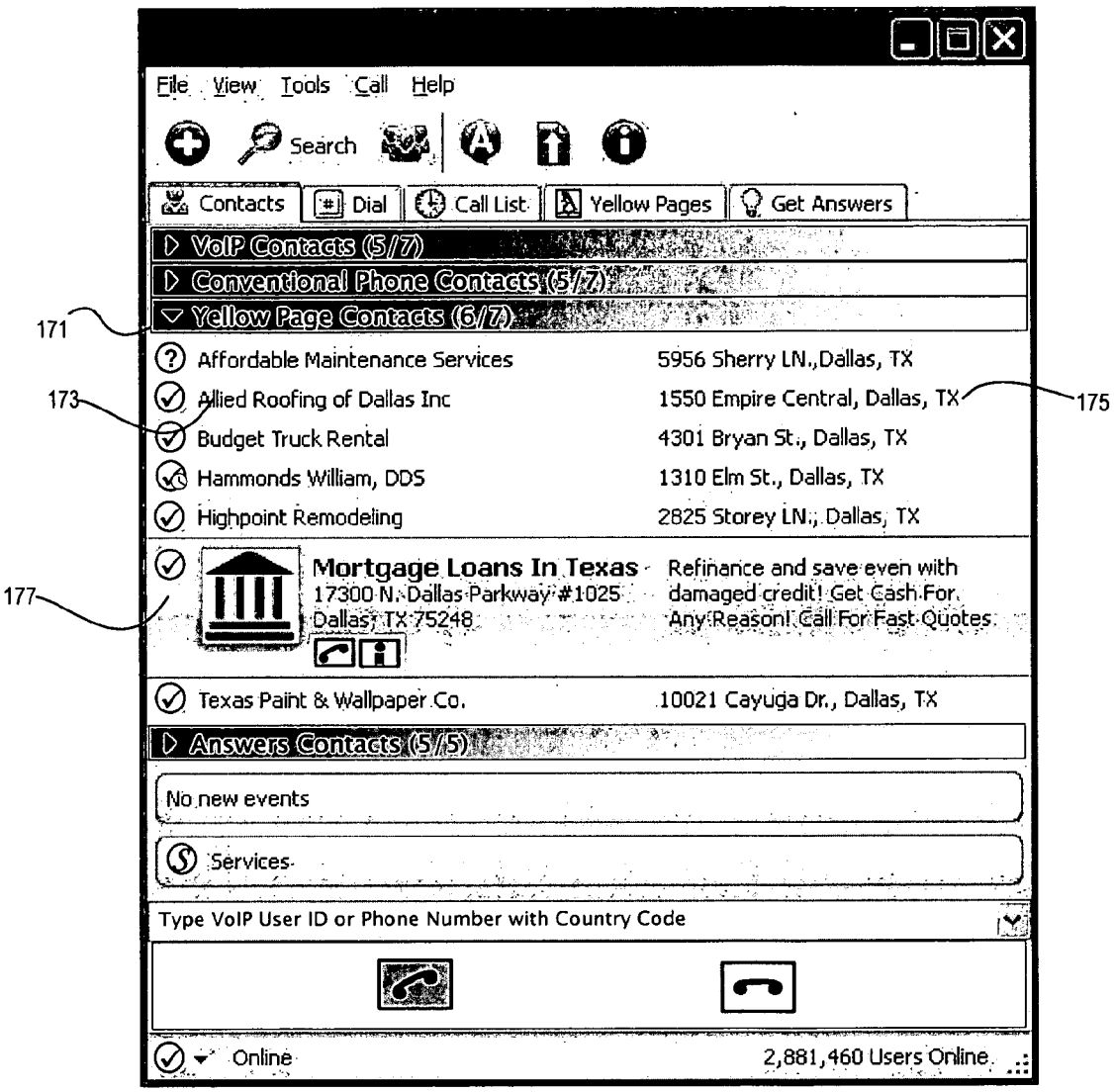
FIG. 4 illustrates a user interface to manage telephonic contact information according to one embodiment of the present invention.

FIG. 4 illustrates a user interface to manage telephonic contact information according to one embodiment of the present invention.

In one embodiment, the entry of the advertiser can be added to the contact collection of the user of the VoIP application. For example, the advertiser being called can be automatically added to the group of "Yellow Page Contacts" (171). Alternatively, a menu item (or a button, or a link) can be presented to add the selected advertiser to the contact list.

In one embodiment, an entry in the "Yellow Page Contacts" (171) includes the name (e.g., 173) and address (e.g., 175) of the advertiser. When the entry (e.g., "Mortgage Loans in Texas") is selected, an expanded view (177) of the entry is displayed in a way an expanded view is displayed for a selected entry in the search results (e.g., 121).

In one embodiment, the advertisement for the contact in the "Yellow Page Contacts" is stored/cached locally with the data of the VoIP application. Alternatively, the current advertisement is retrieved from the advertisement provider when the entry is selected. The retrieval of the advertisement may be based on an identifier of the advertiser, a reference to the advertisement, or based on a search performed using retained information about the advertiser.

In one embodiment, the advertiser's telephonic information is not displayed on the VoIP application. In one embodiment, the telephonic information, or a reference to the telephonic information, is stored in the VoIP application so that the user can use the VoIP application to call the advertiser only through the VoIP application.

In one embodiment, a telephonic contact information assigned to the advertiser may be displayed to the user of the VoIP application. The telephonic contact information provided in the advertisement can be used on other telephonic appliances, such as a landline phone, a mobile phone, or dialed directly using the VoIP application.

For example, the phone number listed in the advertisement for the advertiser is assigned to the advertiser by the phone connection server. When the phone number is called (e.g., using a landline phone, a mobile phone, or a VoIP application), the telephonic connection is established between the consumer and the phone connection server before connecting to the advertiser. The phone connection server looks up the telephonic contact information of the advertiser based on the phone number dialed (and/or the extension dialed after the connection to the phone connection server is established). The phone connection server then joins the two calls to connect the consumer and the advertiser.

In one embodiment, the telephone information listed in the advertisement is a VoIP user ID for the phone connection server, which looks up the telephonic contact information of the advertiser based on the VoIP user ID "dialed" (and/or "extension" dialed after the connection to the phone connection server is established, or parameters submitted when the VoIP call is placed).

In one embodiment, an entry of advertisement/contact is presented on behalf of a group of advertisers (or different offices of an advertiser). After the user initiates the call based on such an entry of advertisement/contact, the user is presented with options to select one of the advertisers (or one of the offices). The options can be presented through voice prompt after the telephonic connection is initiated, or through a graphical user interface. Alternatively, or in combination, the selection based on geographic region may be performed based on an automatic determination of the location of the VoIP application (e.g., through cellular position determination, a GPS system, etc.)

In one embodiment, the user of the VoIP application can also use the VoIP application to manage advertisement(s) submitted to the advertisement provider, as illustrated in FIG. 5. For example, when a tab "My Advertisement Info" (181) is selected (e.g., after the "Become a Yellow Page Advertiser" link (107) in FIG. 1 is selected), a graphical user interface for managing the advertisement of the user is displayed, as illustrated in the example screen image (180).

For example, the user may specify the amount of price per call bid (183) (e.g., "$3.00") in the user interface. The user may further specify/modify the categories (185), service areas (187), description of the advertisement (189), payment methods (191), logo (193), business location (195), etc.

In one embodiment, the business information is collected to present within the advertisement and within the advertiser profile page. In one embodiment, business information and pay per call bid are retrieved from the advertisement database for editing after the user signs into the VoIP application system. In one embodiment, the VoIP user ID of the system is used to identify the advertiser; and the successful authentication in the VoIP application system allows the user to access the advertisement database. Alternatively, separate authentication operations are performed for the VoIP application system and the advertisement database.

In one embodiment, the VoIP application uses the application program interface (API) of the advertisement provider (e.g., Ingenio) to create listings within the VoIP application.

Figure 6:
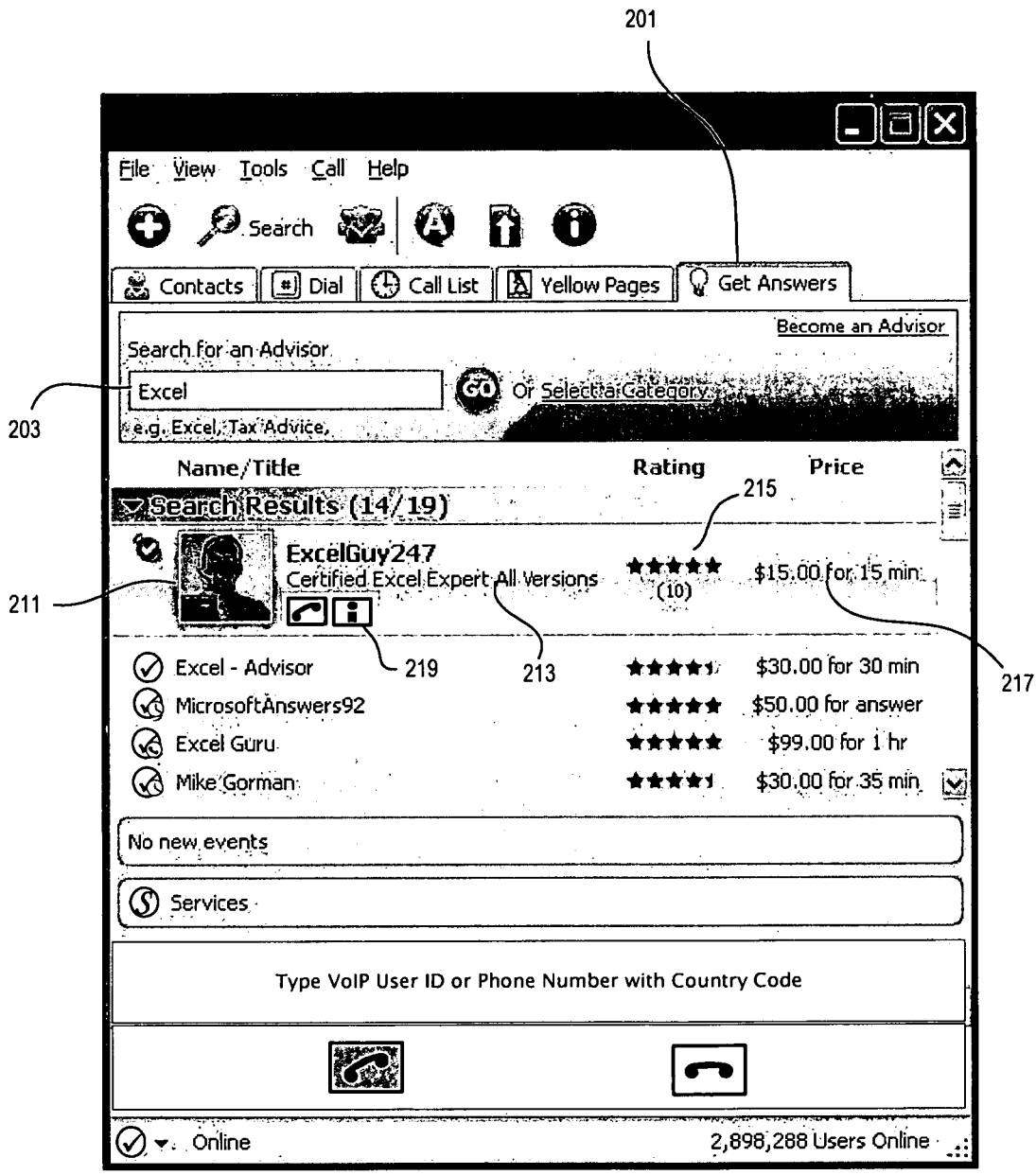
FIGS. 6-8 illustrate screen images of a VoIP application for accessing a service provided over a telephone connection according to embodiments of the present invention.
Figure 7:
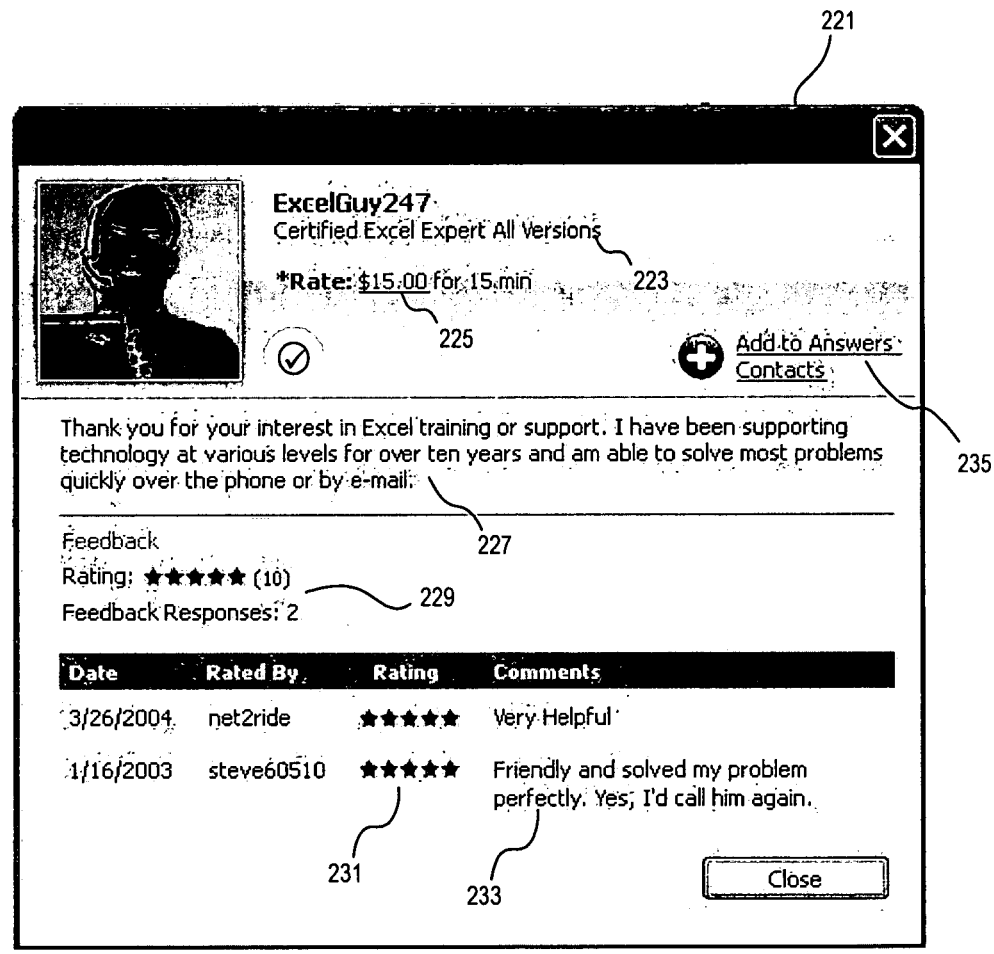
Figure 8:
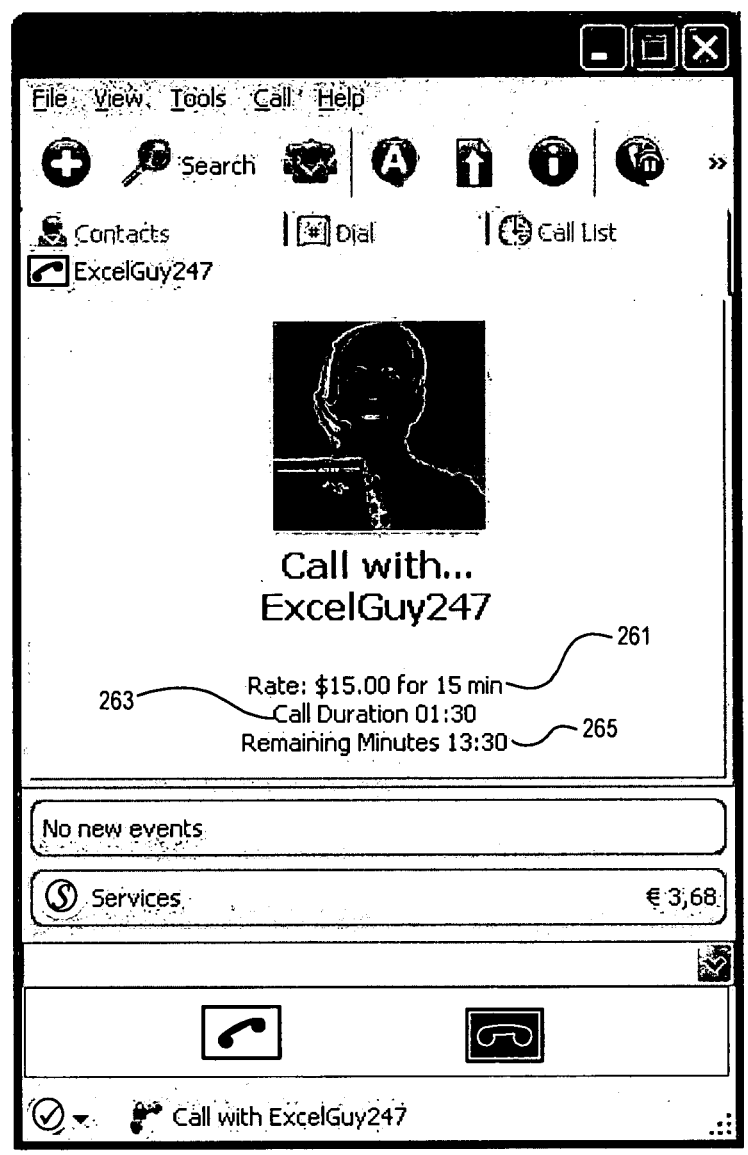

FIGS. 6-8 illustrate screen images of a VoIP application for accessing a service provided over a telephone connection according to embodiments of the present invention.

Similar to searching pay per call advertisers (e.g., according to service category and/or service area), a user of the VoIP may also search advisors using the VoIP application (e.g., after selecting the "Get Answers" tab (201) in the example image). For example, the user may enter one or more key words (e.g., "Excel") in the search box (203) to indicate the requirement for the desired advisors.

In one embodiment, the advisors set their own rates for providing services, such as advice, entertainment, celebrity conversations or other types of paid access, over the telephone link. The search result of the advisors may include entries of advisors. In one embodiment, when expanded an advisor entry shows a photo image (211) of the advisor, a description (213) of the expertise of the advisor, the rating (215) based on the experience of prior activity of the advisor, the price (217), etc.

In one embodiment, the expanded entry further includes an information icon (219), which can be selected to provide a profile page about the advisor, as illustrated in the example image (221). For example, the profile page may include the expertise (223) of the advisor, the rate (225), a detailed description (227), and previous consumer feedback information (229), such as rating (231), comments (233), etc.

In one embodiment, during the telephone conversation, the VoIP application displays the rate (261) for the advisor (e.g., $15.00 for 15 min), the duration (263) of the call, the remaining minutes (265) (when applicable), etc. In one embodiment, the VoIP application also displays the balance amount available in an account which is designated for paying for the call.

In one embodiment, the entry of the advisor can be added to the contact collection of the user of the VoIP application in a way similar to those described for an advertiser entry (e.g., automatically add the advisor into the contact list after the advisor is called).

Figure 9:
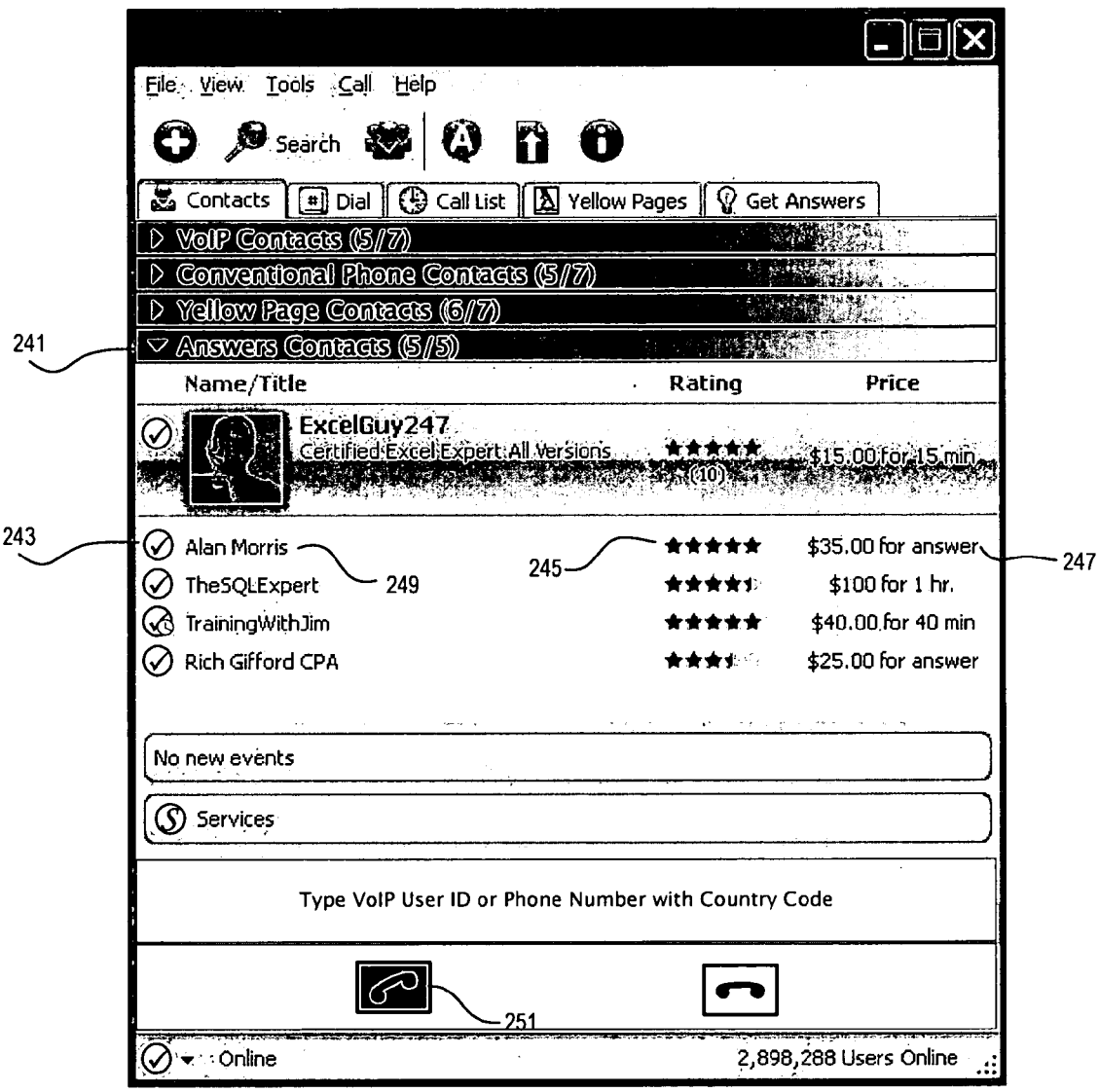
FIG. 9 illustrates a user interface to manage telephonic contact information of service providers according to one embodiment of the present invention.

FIG. 9 illustrates a user interface to manage telephonic contact information of service providers according to one embodiment of the present invention.

In one embodiment, the profile page (221) includes a link "Add to Answers Contacts" (235) which can be selected to add the selected advisor to a personal list of contacts for advisors (241). In one embodiment, before an entry (e.g., 243) is displayed, the current information (e.g., prices (e.g., 247), rating (e.g., 245), etc., of the advisors) are obtained from the advertisement provider. An entry of the advisor contact shows the name (e.g., 249), rating (e.g., 245), price (e.g., 247), etc.

In one embodiment, an advisor entry can be selected to initiate a VoIP telephonic connection with the advisor using the VoIP application (e.g., using the button (251) to initiate the call to the advisor of the selected, expanded entry.

Figure 10:
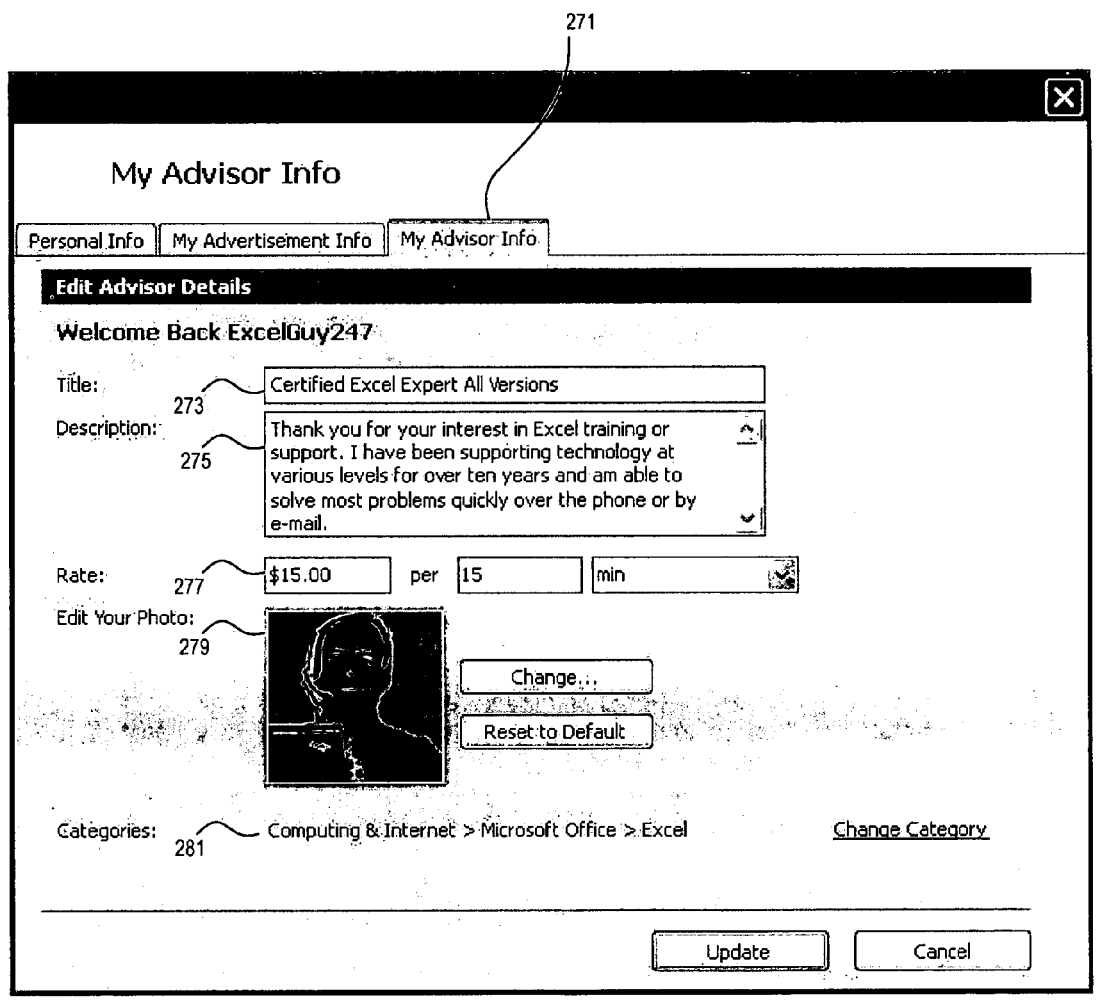

FIGS. 10-11 illustrate screen images of a VoIP application for managing advertisements according to embodiments of the present invention.

In one embodiment, the user of the VoIP application can also be an advisor in the advisor providing system. The user can be presented as an advisor. Using the "My Advisor Info" tab (271), the user can enter the information about the user as an advisor for the network. The advisor information is collected to present in listings and on profile page. In one embodiment, the advisor information includes title (e.g., a name) (273), description (275), rate (e.g., prices) (277), photo (279), categories (281) of the advice service.

In one embodiment, the VoIP application uses the application program interface (API) of the advisor listing provider (e.g., Ingenio) to create listings within the VoIP application.

In one embodiment, an extensive reporting suite provides the VoIP application and the advertiser the tools to see how their listings are performing and make adjustments to maximize their Return on Investment (ROI), as illustrated in the example image (301).

Figure 12:
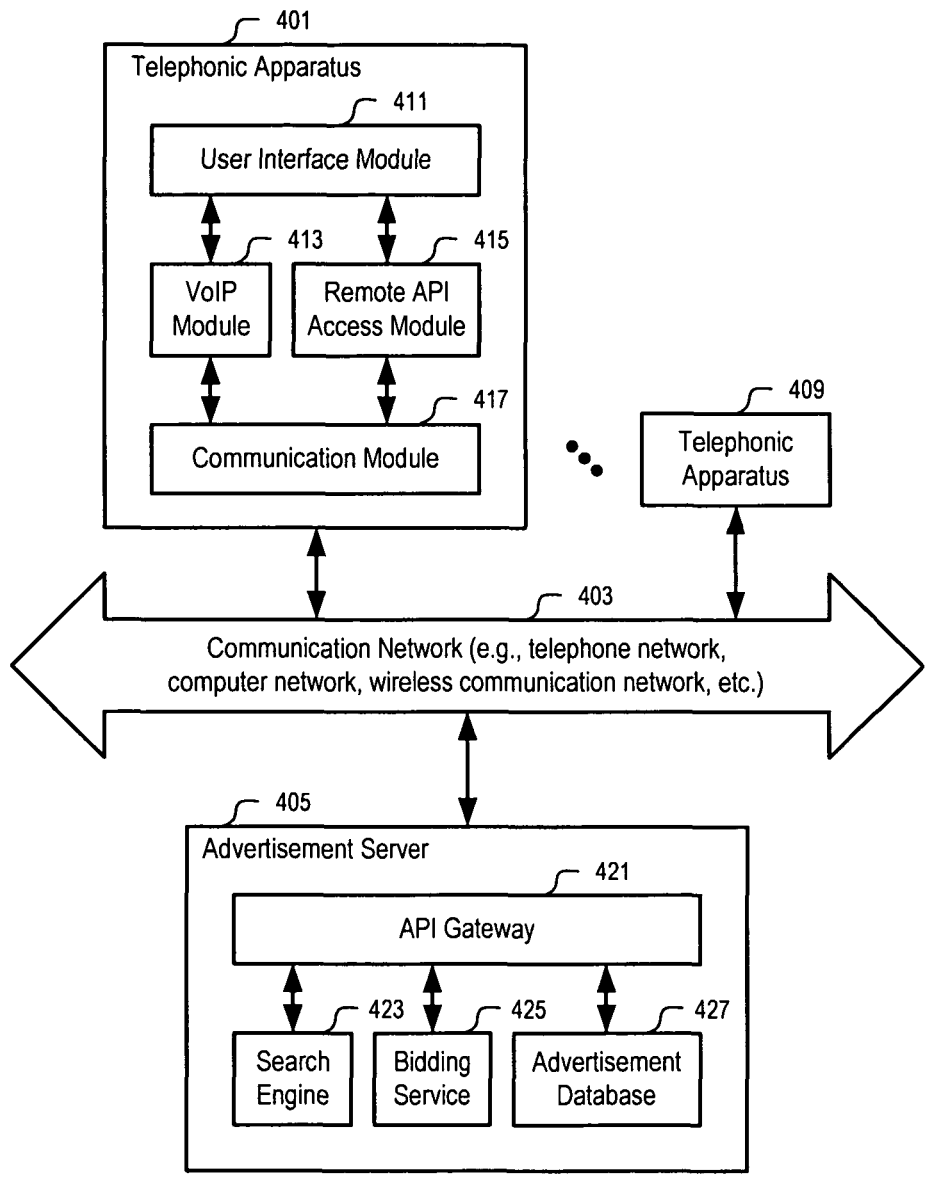
FIG. 12 illustrates a system to display and manage advertisements according to one embodiment of the present invention.

FIG. 12 illustrates a system to display and manage advertisements according to one embodiment of the present invention.

In one embodiment of the present invention, a telephonic apparatus (401) is capable to place and/or receive a VoIP call through the connection to the communication network (403). The communication network may include a telephone network (e.g., for providing an Internet connection), a computer network, a wireless communication network, etc.

In one embodiment, the telephone apparatus (401) includes a VoIP module (413) coupled with a user interface module (411) and a communication module (417) to provide the VoIP telephonic function. In one embodiment, the telephone apparatus (401) can operate to make VoIP calls to other telephonic apparatuses (e.g., 409) without activating the remote API access module (415) and communicating with the advertisement server (405).

In one embodiment, the telephonic apparatus (401) further includes a remote API access module (415) coupled with the user interface module (411) and the communication module (417) to provide access to advertisements. Thus, the access to the advertisements, such as yellow page information and telephonic based service listings, can be conveniently obtained from the user interface of the telephonic apparatus (401).

In one embodiment, the advertisement server (405) provides services access to a search engine (423), a bidding service (425) and an advertisement database (427) through an API gateway (421). The search engine (423) can perform a search on the advertisement database (427) according to user specified search terms. The bidding service (425) can provide competitive bidding information on similar advertisements/service listings.

The API gateway (421) may be implemented using a hypertext transfer protocol (HTTP) server, or a communication server that uses other types of communication protocols. The data may be transferred in a Hypertext Markup Language (HTML) format, or an Extensible Markup Language (XML) format, or a custom designed format.

In one embodiment, the telephonic apparatus (401) uses the remote API access module (415) to submit search requests to the search engine (423) over the communication network (403), retrieve the search results from the API gateway (421), and display the search results in the user interface of the telephonic apparatus.

In one embodiment, the telephonic apparatus (401) displays the advertisements but not the telephonic contact information. Telephonic contact information is when the user requests to call the advertiser of the advertisement.

In one embodiment, no telephonic contact information is transmitted to the telephonic apparatus with the advertisements. Instead, the telephonic contact information for calling the advertiser is retrieved from the advertisement server in a just-in-time fashion after the user requests to call the advertiser who is identified by an identifier embedded in the advertisement or the corresponding identification of the advertisement.

Alternatively, no telephonic contact information is transmitted to the telephonic apparatus for the advertisements. Instead, the user requests to call the advertiser, the telephonic contact information of the telephonic apparatus is transmitted to the API gateway (421) together with an identifier of the advertiser or an identifier of the advertisement. The advertisement server (405) then arranges a call back to the telephonic apparatus to connect the telephonic apparatus (401) to a telephonic apparatus of the advertiser.

It is understood that various modules of the telephonic apparatus can be implemented in hardware, software, or a combination of hardware and software. For example, the VoIP module may be implemented partially using a software program which is to be executed in a microprocessor to assemble/dissemble data packets, to perform data compression/decompression, etc. Alternatively, these functions can be implemented using an Application-Specific Integrated Circuit (ASIC) or a Field-Programmable Gate Array (FPGA).

Figure 13:
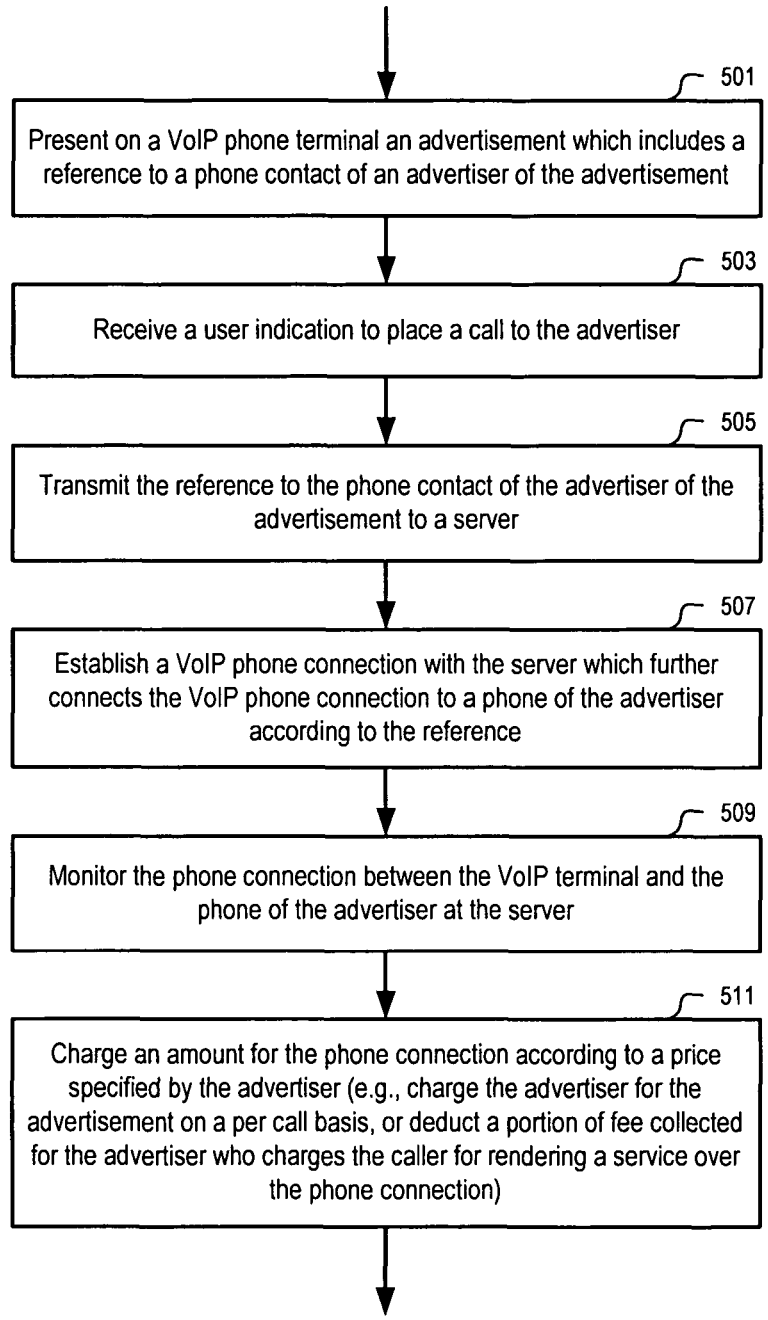
FIG. 13 illustrates a method to display advertisements according to one embodiment of the present invention.

FIG. 13 illustrates a method to display advertisements according to one embodiment of the present invention.

In FIG. 13, an advertisement is presented (501) on a VoIP phone terminal (e.g., in response to one or more search terms submitted from the phone terminal, such as a search term for service category and another search term for a geographic area of the services). In one embodiment, the advertisement includes a reference to a phone contact of an advertiser of the advertisement. The reference may be a direct phone number of the advertiser, or an indirect phone number of a routing server which is assigned to the advertiser, or a VoIP application user ID of the advertiser, or an indirect VoIP application user ID of a routing server which is assigned to the advertiser, or an identifier of the advertiser, or an identifier of the advertisement, etc.

After a user indication to place a call to the advertiser is received (503), the reference to the phone contact of the advertiser of the advertisement is transmitted (505) to a server; and a VoIP phone connection with the server is established (507). The VoIP phone connection between the server and the VoIP terminal may be initiated by the VoIP terminal or the server. The reference to the phone contact may be transmitted through initiate the VoIP phone connection or through a separate data transmission from the VoIP terminal to the server. The server further connects the VoIP phone connection to a phone of the advertiser according to the reference.

In one embodiment, the phone connection between the VoIP terminal and the phone of the advertiser is monitored (509) at the server.

In one embodiment, an amount for the phone connection according to a price specified by the advertiser is charged (511). For example, the advertiser is charged for the advertisement on a per call basis; or a portion of fee collected for the advertiser who charges the caller for rendering a service over the phone connection is deducted as the fee to provide the service to make the phone connection.

Figure 14:
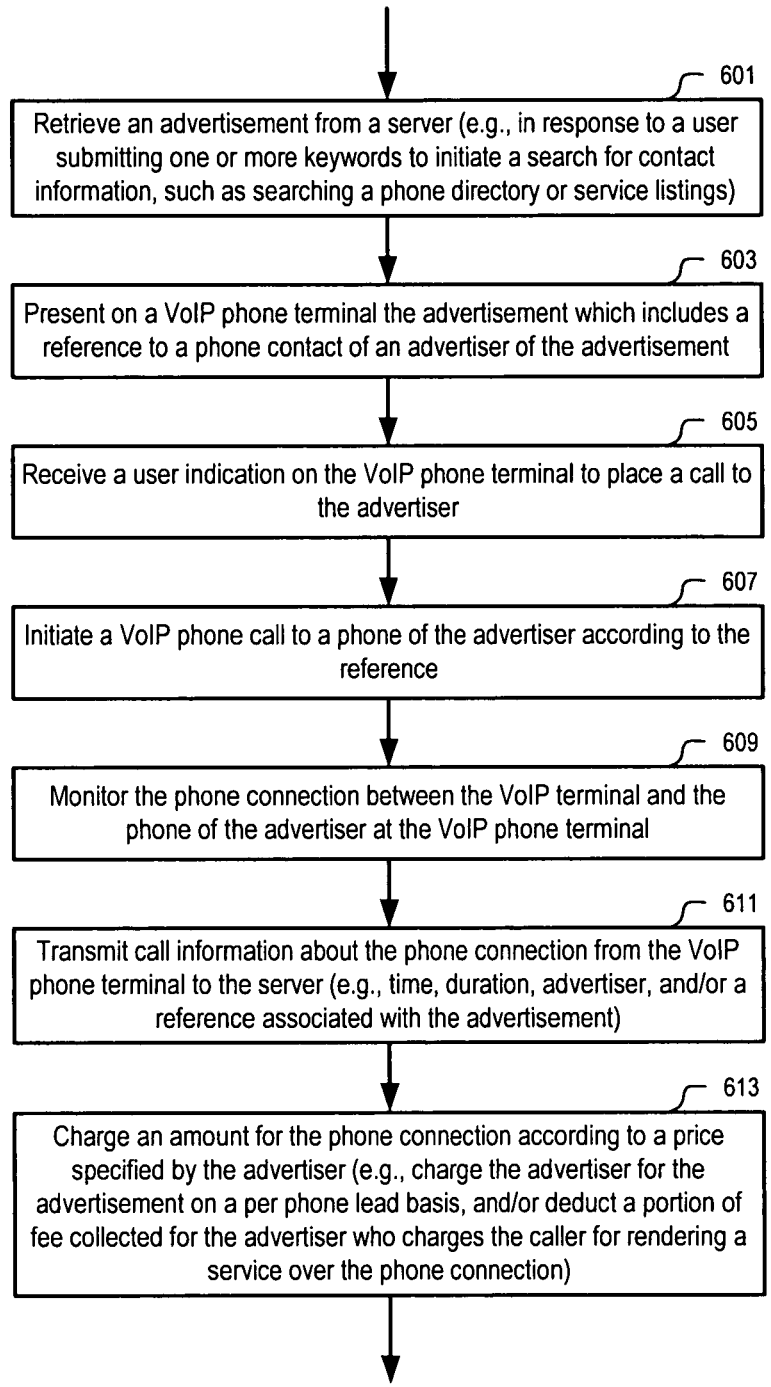
FIG. 14 illustrates a further method to display advertisements according to one embodiment of the present invention.

FIG. 14 illustrates a further method to display advertisements according to one embodiment of the present invention.

In FIG. 14, an advertisement is retrieved (601) from a server (e.g., in response to a user submitting one or more keywords to initiate a search for contact information, such as searching a phone directory or service listings) and presented (603) on a VoIP phone terminal. The advertisement includes a reference to a phone contact of an advertiser of the advertisement, such as a direct phone number of the advertiser, or an indirect phone number of a routing server which is assigned to the advertiser, or a VoIP application user ID of the advertiser, or an indirect VoIP application user ID of a routing server which is assigned to the advertiser, or an identifier of the advertiser, or an identifier of the advertisement, etc.

After a user indication is received (605) on the VoIP phone terminal to place a call to the advertiser, a VoIP phone call is initiated (607) to a phone of the advertiser according to the reference.

In one embodiment, the phone connection between the VoIP terminal and the phone of the advertiser is monitored (609) at the VoIP phone terminal.

The call information about the phone connection is transmitted (611) from the VoIP phone terminal to the server. The call information may include time, duration, advertiser, and/or a reference associated with the advertisement, etc. Based on the call information about the phone connection, an amount for the phone connection is charged (613) according to a price specified by the advertiser (e.g., charge the advertiser for the advertisement on a per phone lead basis, and/or deduct a portion of fee collected for the advertiser who charges the caller for rendering a service over the phone connection).

Figure 15:
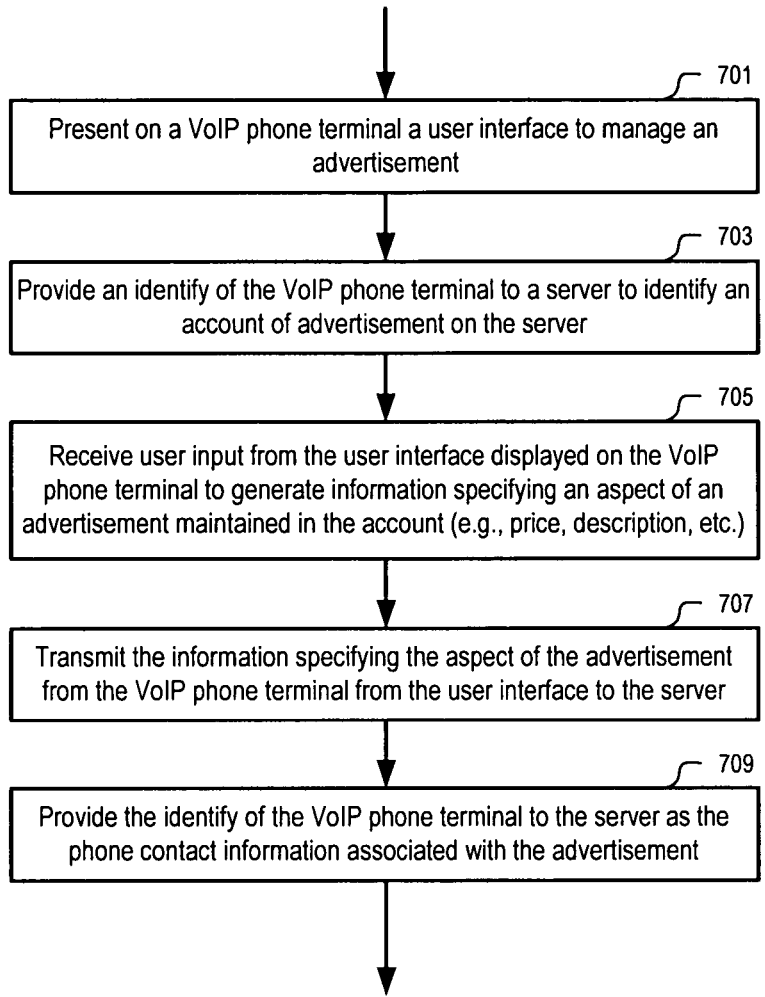
FIG. 15 shows a method to manage an advertisement according to one embodiment of the present invention.

FIG. 15 shows a method to manage an advertisement according to one embodiment of the present invention.

In FIG. 15, a user interface is presented (701) on a VoIP phone terminal to manage an advertisement. An identify of the VoIP phone terminal is provide (703) to a server to identify an account of advertisement on the server.

After user input from the user interface displayed on the VoIP phone terminal is received (705) to generate information specifying an aspect of an advertisement maintained in the account (e.g., price, description, etc.), the information specifying the aspect of the advertisement is transmitted (707) from the VoIP phone terminal from the user interface to the server.

In one embodiment, the identify of the VoIP phone terminal (e.g., a phone number of the VoIP phone terminal or a user ID of the VoIP Phone terminal) is provided (709) (e.g., automatically) to the server as the phone contact information associated with the advertisement.

Figure 16:
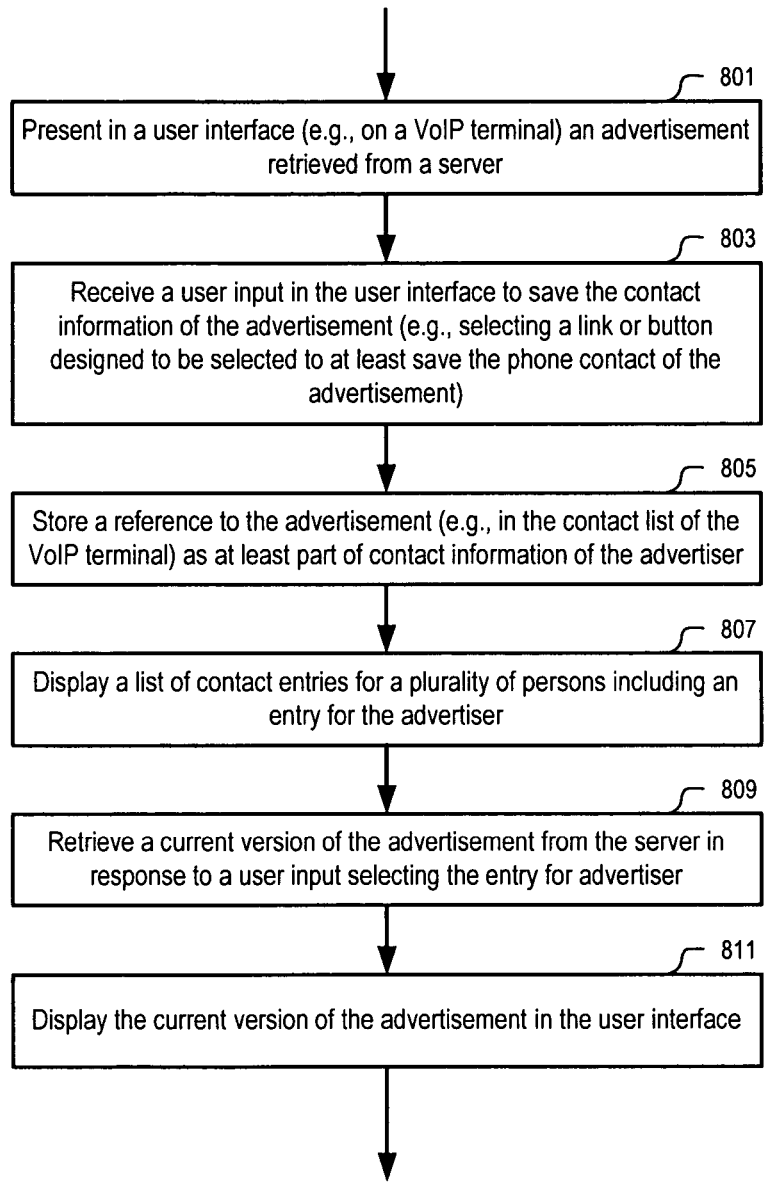
FIG. 16 shows a method to manage telephonic contact information according to one embodiment of the present invention.

FIG. 16 shows a method to manage telephonic contact information according to one embodiment of the present invention.

An advertisement retrieved from a server is presented (801) in a user interface (e.g., on a VoIP terminal). After a user input is received in the user interface to save the contact information of the advertisement (e.g., selecting a link or button designed to be selected to at least save the phone contact of the advertisement), a reference to the advertisement is stored (e.g., in the contact list of the VoIP terminal) as at least part of contact information of the advertiser.

In one embodiment, a list of contact entries can be displayed (807) for a plurality of persons including an entry for the advertiser. In response to a user input selecting the entry for advertiser, a current version of the advertisement is retrieved (809) from the server and displayed (811) in the user interface.

In one embodiment, the actual phone contact information of the advertiser is not displayed, stored, or even transmitted to the VoIP terminal. The current version of the advertisement provides the means for the VoIP terminal to start the telephone connection, as in certain embodiments described above.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

Figure 17:
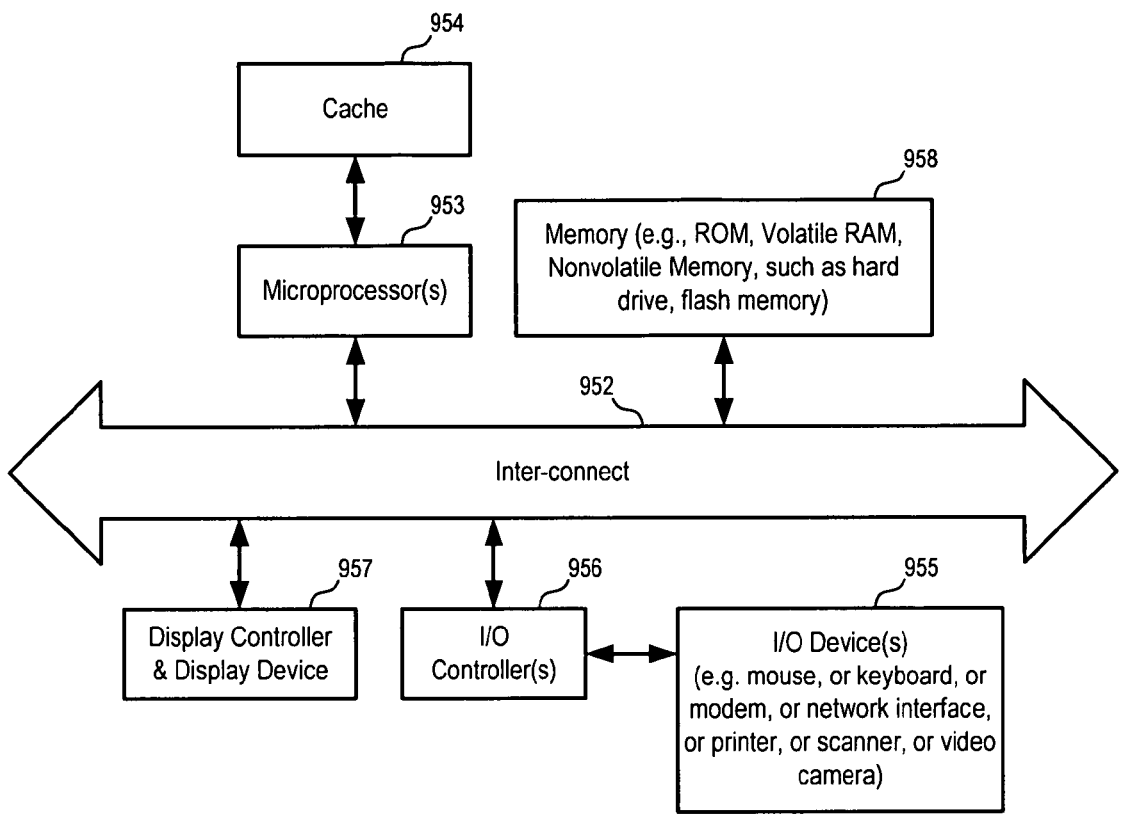
FIG. 17 shows a block diagram example of a data processing system which used with the present invention.

FIG. 17 shows a block diagram example of a data processing system which may be used with the present invention.

While FIG. 17 illustrates various components of a computer system, it is not intended to represent any particular architecture or manner of interconnecting the components. Other systems that have fewer or more components may also be used with the present invention.

In FIG. 17, the communication device (951) is a form of a data processing system. The system (951) includes an inter-connect (952) (e.g., bus and system core logic), which interconnects a microprocessor(s) (953) and memory (958). The microprocessor (953) is coupled to cache memory (954) in the example of FIG. 17.

The inter-connect (952) interconnects the microprocessor(s) (953) and the memory (958) together and also interconnects them to a display controller and display device (957) and to peripheral devices such as input/output (I/O) devices (955) through an input/output controller(s) (956). Typical I/O devices include mice, keyboards, modems, network interfaces, printers, scanners, video cameras and other devices which are well known in the art.

The inter-connect (952) may include one or more buses connected to one another through various bridges, controllers and/or adapters. In one embodiment the I/O controller (956) includes a USB (Universal Serial Bus) adapter for controlling USB peripherals, and/or an IEEE-1394 bus adapter for controlling IEEE-1394 peripherals.

The memory (958) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 17 is used as one of the server(s) (e.g., 405 in FIG. 12).

Further, a user terminal as a client system can be a data processing system similar to the system of FIG. 17. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

Alternatively, the traditional communication client(s) may be used in some embodiments of the present invention.

From this description, it will be appreciated that certain aspects of the invention are embodied in the user devices, certain aspects of the invention are embodied in the server systems, and certain aspects of the invention are embodied in a system as a whole.

Embodiments of the present invention can be implemented using hardware, programs of instruction, or combinations of hardware and programs of instructions.

In general, routines executed to implement the embodiments of the invention may be implemented as part of an operating system or a specific application, component, program, object, module or sequence of instructions referred to as "computer programs. The computer programs typically comprise one or more instructions set at various times in various memory and storage devices in a computer, and that, when read and executed by one or more processors in a computer, cause the computer to perform operations necessary to execute elements involving the various aspects of the invention.

While some embodiments of the invention have been described in the context of fully functioning computers and computer systems, those skilled in the art will appreciate that various embodiments of the invention are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods of the present invention. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects of the present invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A telephonic apparatus, comprising:
   a user interface configured to display an advertisement received from a connection server;
   wherein the telephonic apparatus is configured to:
      retrieve, in response to a request from a user of the telephonic apparatus, a current version of the advertisement from the connection server, wherein the advertisement includes one or more of an identifier for the advertisement and an identifier for an advertiser of the advertisement, and wherein the advertisement does not contain any telephonic contact information for the advertiser;
      display the advertisement via the user interface;
      receive, via the user interface, a request from the user of the telephonic apparatus to call the advertiser of the advertisement; and
      initiate, in response to the request, a voice over internet protocol call to the advertiser of the advertisement by transmitting, to the connection server, telephonic contact information for the telephonic apparatus along with the identifier of the advertiser or the identifier of the advertisement.

2. The telephonic apparatus of claim 1, wherein the telephonic apparatus is one of:
   a wireless mobile phone;
   a cellular phone;
   a voice over internet protocol phone;
   a Bluetooth phone;
   a universal serial bus phone;
   a personal digital assistant; and
   a handheld computer.

3. The telephonic apparatus of claim 1, wherein the advertisement is displayed in response to at least one search term submitted from the user interface to search one of yellow page information and a listing of services provided over a telephonic connection.

4. The telephonic apparatus of claim 1, wherein the telephonic apparatus communicates with the connection server through an application program interface of the connection server to retrieve the advertisement and to retrieve updated information for the advertisement.

5. A method, comprising:
   displaying, via a user interface of a telephonic apparatus, an advertisement received from a connection server;
   retrieving, via the telephonic apparatus and in response to a request from a user of the telephonic apparatus, a current version of the advertisement from the connection server, wherein the advertisement includes one or more of an identifier for the advertisement and an identifier for an advertiser of the advertisement, and wherein the advertisement does not contain any telephonic contact information for the advertiser;
   receiving, via the user interface, a request from the user of the telephonic apparatus to call the advertiser of the advertisement; and
   initiating, via the telephonic apparatus and in response to the request, a voice over internet protocol call to the advertiser of the advertisement by transmitting, to the connection server, telephonic contact information for the telephonic apparatus along with the identifier of the advertiser or the identifier of the advertisement.

6. The method of claim 5, further comprising:
   retrieving, via the telephonic apparatus, the current version of the advertisement from the connection server in response to contact information of the advertiser of the advertisement being requested by the user of the telephonic apparatus.

7. The method of claim 5, further comprising:
   transmitting, via the telephonic apparatus, information about the voice over internet protocol call with the advertiser to a remote server after a successful connection between the telephonic apparatus and the advertiser.

8. A tangible non-transitory computer readable medium storing instructions that, when executed by a telephonic apparatus, cause the telephonic apparatus to:

retrieve, in response to a request from a user of the telephonic apparatus, a current version of an advertisement from a connection server, wherein the advertisement includes one or more of an identifier for the advertisement and an identifier for an advertiser of the advertisement, and wherein the advertisement does not contain any telephonic contact information for the advertiser;

display the advertisement via a user interface of the telephonic apparatus;

initiate, via the telephonic apparatus, a voice over internet protocol call to the advertiser of the advertisement by transmitting, to the connection server, telephonic contact information for the telephonic apparatus along with the identifier of the advertiser or the identifier of the advertisement.

9. The telephonic apparatus of claim 1, wherein displaying the advertisement includes displaying a selectable icon via the user interface, and wherein the user makes the request to call the advertiser by selecting the icon.

10. The method of claim 5, wherein displaying the advertisement includes displaying a selectable icon via the user interface, and wherein the user makes the request to call the advertiser by selecting the icon.

11. The computer readable medium of claim 8, wherein displaying the advertisement includes displaying a selectable icon via the user interface, and wherein the user makes the request to call the advertiser by selecting the icon.

12. The telephonic apparatus of claim 1, wherein the telephonic apparatus is further configured to display, via the user interface and during the call between the user and the advertiser, a duration of the call, a logo for the advertiser, and a per-minute price charged to the user.

13. The method of claim 5, further comprising displaying, via the user interface of the telephonic apparatus and during the call between the user and the advertiser, a duration of the call, a logo for the advertiser, and a per-minute price charged to the user.

14. The computer readable medium of claim 8, wherein the medium further stores instructions to cause the telephonic apparatus to display, via the user interface of the telephonic apparatus and during the call between the user and the advertiser, a duration of the call, a logo for the advertiser, and a per-minute price charged to the user.

15. The telephonic apparatus of claim 12, wherein the telephonic apparatus is further configured to display, via the user interface and during the call between the user and the advertiser, a balance of an account used to pay for the per-minute charges for the call between the user and the advertiser.

16. The method of claim 5, further comprising displaying, via the user interface and during the call between the user and the advertiser, a balance of an account used to pay for the per-minute charges for the call between the user and the advertiser.

17. The computer readable medium of claim 8, wherein the medium further stores instructions to cause the telephonic apparatus to display, via the user interface and during the call between the user and the advertiser, a balance of an account used to pay for the per-minute charges for the call between the user and the advertiser.

18. The telephonic apparatus of claim 1, wherein the advertisement is presented on behalf of a group of advertisers, and wherein the telephonic apparatus is further configured to present the user, after the user initiates the call and via the user interface, an option to select one of the advertisers from the group of advertisers that the user wishes to call.

19. The method of claim 5, wherein the advertisement is presented on behalf of a group of advertisers, and wherein the method further includes presenting the user, after the user initiates the call and via the user interface, an option to select one of the advertisers from the group of advertisers that the user wishes to call.

20. The computer readable medium of claim 8, wherein the advertisement is presented on behalf of a group of advertisers, and wherein the medium further stores instructions to cause the telephonic apparatus to present the user, after the user initiates the call and via the user interface, an option to select one of the advertisers from the group of advertisers that the user wishes to call.

* * * * *